(12) United States Patent  
Funane

(10) Patent No.: US 8,223,400 B2  
(45) Date of Patent: Jul. 17, 2012

(54) MANAGEMENT APPARATUS AND MANAGEMENT METHOD

(75) Inventor: Nao Funane, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 619 days.

(21) Appl. No.: 12/417,539

(22) Filed: Apr. 2, 2009

(65) Prior Publication Data

US 2009/0251713 A1    Oct. 8, 2009

(30) Foreign Application Priority Data

Apr. 2, 2008   (JP) .................................. 2008-096021

(51) Int. Cl.
*G06K 15/00* (2006.01)
*G06F 13/00* (2006.01)

(52) U.S. Cl. .......... 358/1.9; 358/1.14; 358/1.15; 399/79

(58) Field of Classification Search ................... 358/1.9, 358/1.13, 1.14, 1.15, 1.16, 1.1; 399/79, 85, 399/75

See application file for complete search history.

(56) References Cited

U.S. PATENT DOCUMENTS

| | | | | |
|---|---|---|---|---|
| 5,363,173 A | * | 11/1994 | Alesio et al. | 399/85 |
| 6,944,642 B1 | * | 9/2005 | Hopmann et al. | 709/203 |
| 6,975,417 B1 | * | 12/2005 | Hilpl et al. | 358/1.15 |
| 7,686,525 B2 | * | 3/2010 | Uchida | 399/75 |
| 7,715,030 B2 | * | 5/2010 | Higashiura et al. | 358/1.14 |
| 7,872,771 B2 | * | 1/2011 | Kojima et al. | 358/1.15 |
| 2005/0117180 A1 | | 6/2005 | Kato | |
| 2006/0082802 A1 | * | 4/2006 | Furuya | 358/1.13 |
| 2006/0268306 A1 | * | 11/2006 | Kojima et al. | 358/1.13 |
| 2007/0276781 A1 | * | 11/2007 | Kawamoto et al. | 707/1 |
| 2009/0021757 A1 | * | 1/2009 | Liu et al. | 358/1.13 |
| 2011/0116131 A1 | * | 5/2011 | Mitsui | 358/1.15 |

FOREIGN PATENT DOCUMENTS

| | | |
|---|---|---|
| JP | 05-207148 A | 8/1993 |
| JP | 2005-190467 | 7/2005 |
| JP | 2007-074267 A | 3/2007 |
| JP | 2007-329734 A | 12/2007 |

* cited by examiner

*Primary Examiner* — Kimberly A Williams

(74) *Attorney, Agent, or Firm* — Canon USA Inc. IP Division

(57) ABSTRACT

If different settings are performed for a user to control usage of functions provided by an image forming apparatus, a management apparatus detects whether resources relating to these settings accord with each other to confirm any conflict between these settings. A plugin management unit detects whether a resource relating to a setting by a plugin B, which is to be installed from a plugin management table, accords with a resource relating to a setting by a plugin A.

13 Claims, 30 Drawing Sheets

FIG.4

| PLUGIN NAME | FUNCTION NAME | DEVICE RESOURCE | EXCLUSIVE/ SHARED | PRIORITY ORDER |
|---|---|---|---|---|
| PLUGIN A | COLOR UPPER-LIMIT VALUE SETTING | NUMBER OF REMAINING COLOR PRINTABLE SHEETS | EXCLUSIVE | 100 |
| PLUGIN A | MONOCHROME UPPER-LIMIT VALUE SETTING | NUMBER OF REMAINING MONOCHROME PRINTABLE SHEETS | EXCLUSIVE | 100 |

FIG.5

| PLUGIN ID | PLUGIN NAME | FUNCTION NAME | DEVICE RESOURCE | EXCLUSIVE/ SHARED | PRIORITY ORDER | EFFECTIVE/ INEFFECTIVE |
|---|---|---|---|---|---|---|
| 0001 | PLUGIN P1 | F1 | R1 | EXCLUSIVE | 10 | EFFECTIVE |
| 0002 | PLUGIN P2 | F2 | R2 | SHARED | 300 | EFFECTIVE |

FIG.6

| PLUGIN ID | PLUGIN NAME | FUNCTION NAME | DEVICE RESOURCE | EXCLUSIVE/ SHARED | PRIORITY ORDER | EFFECTIVE/ INEFFECTIVE |
|---|---|---|---|---|---|---|
| 0001 | PLUGIN P1 | F1 | R1 | EXCLUSIVE | 10 | EFFECTIVE |
| 0002 | PLUGIN P2 | F2 | R2 | SHARED | 300 | EFFECTIVE |
| 0003 | PLUGIN A | COLOR UPPER-LIMIT VALUE SETTING | NUMBER OF REMAINING COLOR PRINTABLE SHEETS | EXCLUSIVE | 100 | EFFECTIVE |
| 0003 | PLUGIN A | MONOCHROME UPPER-LIMIT VALUE SETTING | NUMBER OF REMAINING MONOCHROME PRINTABLE SHEETS | EXCLUSIVE | 100 | EFFECTIVE |

FIG.7

| PLUGIN NAME | FUNCTION NAME | DEVICE RESOURCE | EXCLUSIVE/ SHARED | PRIORITY ORDER |
|---|---|---|---|---|
| PLUGIN B | COLOR PRINT RESTRICTION | NUMBER OF REMAINING COLOR PRINTABLE SHEETS | EXCLUSIVE | 50 |
| PLUGIN B | FAX TRANSMISSION SETTING | FAX TRANSMISSION | EXCLUSIVE | 50 |

FIG.8

FUNCTION SELECTION

☑ COLOR PRINT SETTING

☑ FAX TRANSMISSION SETTING

! THERE IS A PLUGIN CONFLICTING WITH THIS FUNCTION. IF THIS FUNCTION IS ON, "COLOR UPPER-LIMIT VALUE SETTING" OF "PLUGIN A" IS DISABLED.

[ NEXT ]

FIG.9

FUNCTION SELECTION

☐ COLOR PRINT SETTING

☑ FAX TRANSMISSION SETTING

! THIS FUNCTION IS CURRENTLY UNUSABLE BECAUSE OF PRESENCE OF PLUGIN CONFLICTING WITH THIS FUNCTION.

[ NEXT ]

FIG.11

| PLUGIN ID | PLUGIN NAME | FUNCTION NAME | DEVICE RESOURCE | EXCLUSIVE/ SHARED | PRIORITY ORDER | EFFECTIVE/ INEFFECTIVE |
|---|---|---|---|---|---|---|
| 0003 | PLUGIN A | COLOR UPPER-LIMIT VALUE SETTING | NUMBER OF REMAINING COLOR PRINTABLE SHEETS | EXCLUSIVE | 100 | INEFFECTIVE |
| 0003 | PLUGIN A | MONOCHROME UPPER-LIMIT VALUE SETTING | NUMBER OF REMAINING MONOCHROME PRINTABLE SHEETS | EXCLUSIVE | 100 | EFFECTIVE |
| 0004 | PLUGIN B | COLOR PRINT RESTRICTION | NUMBER OF REMAINING COLOR PRINTABLE SHEETS | EXCLUSIVE | 50 | EFFECTIVE |
| 0004 | PLUGIN B | FAX TRANSMISSION SETTING | FAX TRANSMISSION | EXCLUSIVE | 50 | EFFECTIVE |

FIG.13

| NUMBER | DEVICE RESOURCE | RELEVANT RESOURCE LIST | OPERATION TO BE PERFORMED IN CASE OF CONFLICT |
|---|---|---|---|
| 1 | NUMBER OF REMAINING COLOR PRINTABLE SHEETS | 2, 3 | (1) [WHEN COLOR PRINTABLE SHEET NUMBER HAS HIGHER PRIORITY]<br><TOTAL NUMBER OF SHEETS> = <NUMBER OF COLOR SHEETS> + <NUMBER OF MONOCHROME SHEETS><br>(2) [WHEN COLOR PRINTABLE SHEET NUMBER HAS LOWER PRIORITY]<br><NUMBER OF COLOR SHEETS> = <TOTAL NUMBER OF SHEETS> - <NUMBER OF MONOCHROME SHEETS> |
| 2 | NUMBER OF REMAINING MONOCHROME PRINTABLE SHEETS | 1, 3 | (1) [WHEN MONOCHROME PRINTABLE SHEET NUMBER HAS HIGHER PRIORITY]<br><TOTAL NUMBER OF SHEETS> = <NUMBER OF COLOR SHEETS> + <NUMBER OF MONOCHROME SHEETS><br>(2) [WHEN MONOCHROME PRINTABLE SHEET NUMBER HAS LOWER PRIORITY]<br><NUMBER OF MONOCHROME SHEETS> = <TOTAL NUMBER OF SHEETS> - <NUMBER OF COLOR SHEETS> |
| 3 | TOTAL NUMBER OF PRINTABLE SHEETS | 1, 2 | (1) [WHEN TOTAL PRINTABLE SHEET NUMBER HAS HIGHER PRIORITY]<br>(1)-1 IF PRIORITY OF [COLOR] > PRIORITY OF [MONOCHROME], THEN THE METHOD FOR SETTING <TOTAL NUMBER OF SHEETS> IS <TOTAL NUMBER OF SHEETS> = SETTING VALUE, AND THE METHOD FOR SETTING <NUMBER OF COLOR SHEETS> AND <NUMBER OF MONOCHROME SHEETS> IS, IF [TOTAL NUMBER OF SHEETS] ≥ [NUMBER OF COLOR SHEETS], THEN <NUMBER OF COLOR SHEETS> = SETTING VALUE, AND <NUMBER OF MONOCHROME SHEETS> = <TOTAL NUMBER OF SHEETS> - <NUMBER OF COLOR SHEET><br>IF [TOTAL NUMBER OF SHEETS] < [NUMBER OF COLOR SHEETS], THEN <NUMBER OF COLOR SHEETS> = <TOTAL NUMBER OF SHEETS>, AND <NUMBER OF MONOCHROME SHEETS> = 0<br><br>(1)-2 IF PRIORITY OF [COLOR] = PRIORITY OF [MONOCHROME], THEN THE METHOD FOR SETTING <TOTAL NUMBER OF SHEETS> IS <TOTAL NUMBER OF SHEETS> = SETTING VALUE, AND THE METHOD FOR SETTING <NUMBER OF COLOR SHEETS> AND <NUMBER OF MONOCHROME SHEETS> IS, <NUMBER OF COLOR SHEETS>/n + <NUMBER OF MONOCHROME SHEETS>/n = <TOTAL NUMBER OF SHEETS><br><br>(1)-3 IF PRIORITY OF [COLOR] < PRIORITY OF [MONOCHROME], THEN THE METHOD FOR SETTING <TOTAL NUMBER OF SHEETS> IS <TOTAL NUMBER OF SHEETS> = SETTING VALUE, AND THE METHOD FOR SETTING <NUMBER OF COLOR SHEETS> AND <NUMBER OF MONOCHROME SHEETS> IS IF [TOTAL NUMBER OF SHEETS] ≥ [NUMBER OF MONOCHROME SHEETS], THEN <NUMBER OF MONOCHROME SHEETS> = SETTING VALUE, AND <NUMBER OF COLOR SHEETS> = <TOTAL NUMBER OF SHEETS> - <NUMBER OF MONOCHROME SHEET><br>IF [TOTAL NUMBER OF SHEETS] < [NUMBER OF MONOCHROME SHEETS], THEN <NUMBER OF COLOR SHEETS> = <TOTAL NUMBER OF SHEETS>, AND <NUMBER OF MONOCHROME SHEETS> = 0<br><br>(2) [WHEN TOTAL PRINTABLE SHEET NUMBER HAS LOWER PRIORITY]<br><TOTAL NUMBER OF SHEETS> = <NUMBER OF COLOR SHEETS> + <NUMBER OF MONOCHROME SHEETS> |

FIG.15

| PLUGIN ID | PLUGIN NAME | FUNCTION NAME | DEVICE RESOURCE NUMBER | EXCLUSIVE/ SHARED | PRIORITY ORDER | EFFECTIVE/ INEFFECTIVE | OPERATION |
|---|---|---|---|---|---|---|---|
| 0003 | PLUGIN A | COLOR UPPER-LIMIT VALUE SETTING | 1 | SHARED | 100 | INEFFECTIVE | |
| 0003 | PLUGIN A | MONOCHROME UPPER-LIMIT VALUE SETTING | 2 | SHARED | 100 | EFFECTIVE | |

FIG.16

| PLUGIN NAME | FUNCTION NAME | DEVICE RESOURCE NUMBER | EXCLUSIVE/ SHARED | PRIORITY ORDER |
|---|---|---|---|---|
| PLUGIN B | ACCOUNTING MANAGEMENT | 3 | SHARED | 300 |

FIG.18

USER INFORMATION SETTING

BASIC USER INFORMATION

USER CURRENTLY SET: User A

USER NAME: User A

MAIL ADDRESS: UserA@xxx.xxx

PLUGIN A ADDITIONAL SETTING ITEMS

COLOR UPPER-LIMIT NUMBER OF SHEETS: 2000

MONOCHROME UPPER-LIMIT NUMBER OF SHEETS: 8000

PLUGIN B ADDITIONAL SETTING ITEMS

AMOUNT OF MONEY CHARGED: 1000 YEN

PRICE PER SHEET: 1 YEN

SETTING

FIG.23

| ADMINISTRATOR ID | ADMINISTRATOR NAME | MAIL ADDRESS |
|---|---|---|
| 0001 | Manager A | ManagerA@xxx.xx.xx |
| 0002 | Manager B | ManagerB@xxx.xx.xx |
| 0003 | Manager C | ManagerC@xxx.xx.xx |

FIG.24

| PLUGIN ID | ADMINISTRATOR ID |
|---|---|
| 0003 | 0001 |
| 0004 | 0002 |
| 0005 | 0003 |
|  | 0004 |

| ADMINISTRATOR ID | NOTIFICATION METHOD |
|---|---|
| 0001 | MAIL TRANSMISSION |
| 0002 | UI DISPLAY |
| 0003 | NOT NOTIFY |
| 0004 | MAIL TRANSMISSION |

FIG.27

ADDITION OF ADMINISTRATOR

USER NAME: Manager A

MAIL ADDRESS: ManagerA@xxx.xx.xx

PLUGIN SETTING CHANGE NOTIFICATION: ● E-MAIL ○ UI DISPLAY ○ NOT NOTIFY

[ADD] [CANCEL]

FIG.28

PORTAL

NOTICE

ONE NOTICE IS PRESENT — CLICK HERE »

STANDBY PROCESSING

ONE STANDBY PROCESSING IS PRESENT — CLICK HERE »

FIG.29

| PLUGIN ID | PLUGIN NAME | FUNCTION NAME | DEVICE RESOURCE | EXCLUSIVE/ SHARED | PRIORITY ORDER | EFFECTIVE/ INEFFECTIVE |
|---|---|---|---|---|---|---|
| 0001 | PLUGIN P1 | F1 | R1 | EXCLUSIVE | 10 | EFFECTIVE |
| 0002 | PLUGIN P2 | F2 | R2 | SHARED | 300 | EFFECTIVE |
| 0003 | PLUGIN A | COLOR UPPER-LIMIT VALUE SETTING | NUMBER OF REMAINING COLOR PRINTABLE SHEETS | EXCLUSIVE | 100 | WAITING FOR APPROVAL (BEFORE CHANGE: EFFECTIVE, AFTER CHANGE: INEFFECTIVE) |
| 0003 | PLUGIN A | MONOCHROME UPPER-LIMIT VALUE SETTING | NUMBER OF REMAINING MONOCHROME PRINTABLE SHEETS | EXCLUSIVE | 100 | EFFECTIVE |
| 0004 | PLUGIN B | COLOR PRINT RESTRICTION | NUMBER OF REMAINING COLOR PRINTABLE SHEETS | EXCLUSIVE | 50 | WAITING FOR APPROVAL (BEFORE CHANGE: INEFFECTIVE, AFTER CHANGE: EFFECTIVE) |
| 0004 | PLUGIN B | FAX TRANSMISSION SETTING | FAX TRANSMISSION | EXCLUSIVE | 50 | EFFECTIVE |

FIG.31

SETTING CHANGE APPROVAL

SETTING CHANGE REQUEST PLUGIN INFORMATION

PLUGIN NAME: PLUGIN B
FUNCTION NAME: COLOR PRINT RESTRICTION

INFLUENCE ON YOUR MANAGING PLUGIN

PLUGIN NAME: PLUGIN A
FUNCTION NAME: COLOR PRINT SHEET NUMBER RESTRICTION
BEFORE CHANGE: EFFECTIVE
AFTER CHANGE: INEFFECTIVE

APPROVAL   DENIAL

FIG.33

USER INFORMATION SETTING

CURRENTLY EDITING USER: User A

BASIC INFORMATION

| USER NAME | User A |
|---|---|
| MAIL ADDRESS | UserA@xxx.xx.xx |

PLUGIN A

| COLOR UPPER-LIMIT VALUE | 100 |
|---|---|
| MONOCHROME UPPER-LIMIT VALUE | 1000 |

PLUGIN B

| COLOR PRINT RESTRICTION | ○ COLOR PRINT APPROVED | ⊙ COLOR PRINT DENIED |
|---|---|---|
| FAX TRANSMISSION RESTRICTION | ⊙ FAX TRANSMISSION APPROVED | ○ FAX TRANSMISSION DENIED |

BT11 — [SETTING] [CANCEL]

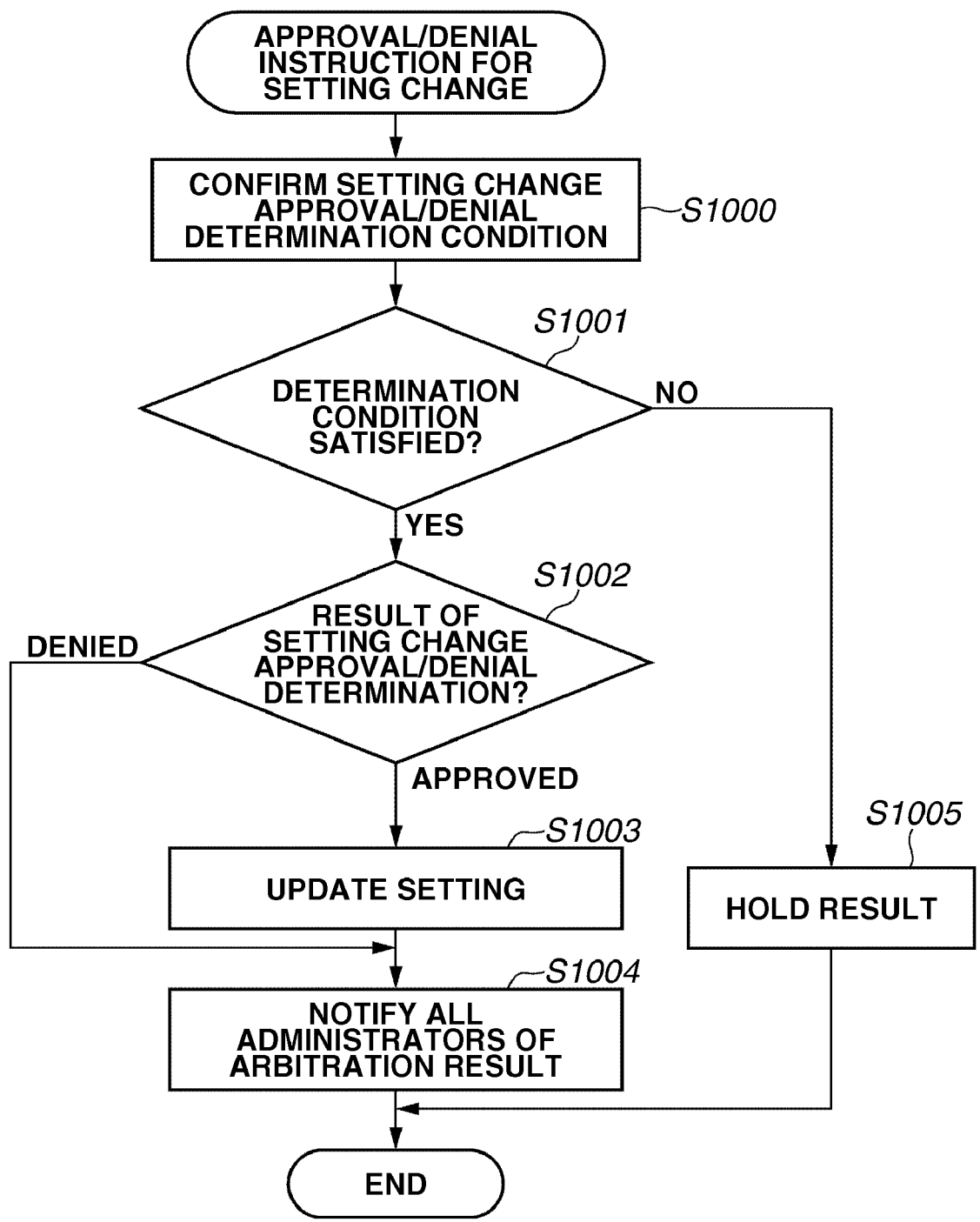

FIG.35

FD/CD-ROM OR COMPATIBLE STORAGE MEDIUM

| DIRECTORY INFORMATION |
|---|
| PROGRAM CODE CORRESPONDING TO STEPS OF FLOWCHART ILLUSTRATED IN FIG. 3 |
| PROGRAM CODE CORRESPONDING TO STEPS OF FLOWCHART ILLUSTRATED IN FIG. 10 |
| PROGRAM CODE CORRESPONDING TO STEPS OF FLOWCHART ILLUSTRATED IN FIG. 14 |
| PROGRAM CODE CORRESPONDING TO STEPS OF FLOWCHART ILLUSTRATED IN FIG. 17 |
| PROGRAM CODE CORRESPONDING TO STEPS OF FLOWCHART ILLUSTRATED IN FIG. 19 |
| PROGRAM CODE CORRESPONDING TO STEPS OF FLOWCHART ILLUSTRATED IN FIG. 21 |
| PROGRAM CODE CORRESPONDING TO STEPS OF FLOWCHART ILLUSTRATED IN FIG. 30 |
| PROGRAM CODE CORRESPONDING TO STEPS OF FLOWCHART ILLUSTRATED IN FIG. 32 |
| PROGRAM CODE CORRESPONDING TO STEPS OF FLOWCHART ILLUSTRATED IN FIG. 34 |

MANAGEMENT APPARATUS AND MANAGEMENT METHOD

BACKGROUND OF THE INVENTION

1. Field of the Invention

The present invention relates to a management apparatus and a management method for executing device resource conflict avoidance processing. More specifically, detection performed, when different settings are performed for a user.

2. Description of the Related Art

There is a conventional system including a plurality of devices, such as copying machines and printers, which are integrally managed. In this system, a device management apparatus has a basic device management function, according to which necessary functions can be later added. Each additional function can be installed as a plugin on the management apparatus, so that new functions can be used without requiring any change of the original system.

However, new functions provided by the additionally installed plugin may conflict with existing functions.

For example, as discussed in Japanese Patent Application Laid-Open No. 2005-190467, a "bookbinding print" function (a function provided by an additional plugin) is added to a printer driver. It is now assumed that, when a user instructs a print, the user sets a "group" print as an existing function of the printer driver and sets the "bookbinding print" function as a function of the additional plugin. The above-described functions set by the user cannot be simultaneously executed by a printer. Therefore, the system discussed in Japanese Patent Application Laid-Open No. 2005-190467 performs control for avoiding any conflict between the setting items.

As a function capable of limiting the usage of a device, conventional device management systems can manage the upper-limit number of sheets usable for printing or can perform an accounting management using the upper-limit amount of money based on the number of sheets used for printing and print settings.

For example, an example case where these functions are simultaneously installed as plugins on the management apparatus of the system is described below.

A system stores a device resource "number of remaining printable sheets" for each user, as a device resource to be used in a print management. The system refuses a print instruction requested by a user who uses the print function at the time when the "number of remaining printable sheets" becomes "0."

For example, a plugin A capable of controlling the print by a user based on the upper-limit number of sheets sets the upper-limit number of sheets for the user to 100. A plugin B capable of controlling the print by a user based on the print fee sets the upper-limit amount of money for the use to 1000 yen and sets the amount of money per sheet to 1 yen.

In this case, according to the function of the plugin A, the above-described device resource "number of remaining printable sheets" is set to "100" and stored.

On the other hand, according to the function of the plugin B, the number of printable sheets by the user can be calculated as 1000 (=(upper-limit amount of money)÷(amount of money/per sheet)) referring to the setting amount of money and the amount of money per sheet. The above-described device resource "number of remaining printable sheets" is set to "1000."

If execution according to the setting by the plugin A is earlier than execution according to the setting by the plugin B, the device resource "number of remaining printable sheets" is once set to "100" and is later overwritten to "1000" as a finalized value. In this case, the number of sheets actually used for printing is "1000", nevertheless the upper-limit number of sheets set by the plugin A is "100."

As described above, when the "number of printing sheets" setting and the "amount of money" setting (i.e., different setting items of two plugin functions) are related to the same device resource, users cannot accurately perform the settings as intended.

SUMMARY OF THE INVENTION

Exemplary embodiments of the present invention are directed to a detection performed, when different settings are performed for a user to control usage of functions provided by a device, to determine whether resources relating to these settings accord with each other to confirm any conflict between the settings.

The exemplary embodiments of the present invention are further directed to a conflict avoidance function usable if different settings are performed for a user to control usage of functions provided by a device and when the resources relating to these settings accord with each other.

According to an aspect of the present invention, a management apparatus configured to control usage of functions provided by an image forming apparatus includes a storage unit configured to store values usable for resources to be used for the functions provided by the image forming apparatus for each user; a first setting unit configured to perform a first setting for the user to control the usage of the functions provided by the image forming apparatus; a second setting unit configured to perform a second setting for the user, which is different from the first setting, to control the usage of the functions provided by the image forming apparatus; and a detection unit configured to detect whether a resource relating to the first setting accords with a resource relating to the second setting to confirm any conflict between the first setting and the second setting, wherein if the detection unit detects that the resource relating to the first setting disaccords with the resource relating to the second setting, the storage unit stores the value usable for the resource relating to the first setting based on the first setting and stores the value usable for the resource relating to the second setting based on the second setting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 4 illustrates example plugin information included in a plugin installation package managed by a server illustrated in FIG. 1.

FIG. 5 illustrates an example plugin management table stored by a plugin information holding unit illustrated in FIG. 2.

FIG. 6 illustrates an example plugin management table stored by the plugin information holding unit illustrated in FIG. 2.

FIG. 7 illustrates example plugin information managed by the server illustrated in FIG. 1.

FIG. 8 illustrates an example user interface provided by the management apparatus according to an exemplary embodiment of the present invention.

FIG. 9 illustrates an example user interface provided by the management apparatus according to an exemplary embodiment of the present invention.

FIG. 11 illustrates an example plugin management table managed by the management apparatus according to an exemplary embodiment of the present invention.

FIG. 13 illustrates an example device resource management table, which stores relevant information among device resources and operations to be performed in case of conflict, used by the management apparatus according to an exemplary embodiment of the present invention.

FIG. 15 illustrates an example plugin management table managed by the management apparatus according to an exemplary embodiment of the present invention.

FIG. 16 illustrates an example plugin management table managed by the management apparatus according to an exemplary embodiment of the present invention.

FIG. 18 illustrates an example user interface provided by the management apparatus according to an exemplary embodiment of the present invention.

FIG. 23 illustrates example administrator information used by the management apparatus according to an exemplary embodiment of the present invention.

FIG. 24 illustrates example plugin information used by the management apparatus according to an exemplary embodiment of the present invention.

FIG. 27 illustrates an example user interface provided by the management apparatus according to an exemplary embodiment of the present invention.

FIG. 28 illustrates an example user interface provided by the management apparatus according to an exemplary embodiment of the present invention.

FIG. 29 illustrates an example plugin management table used by the management apparatus according to an exemplary embodiment of the present invention.

FIG. 31 illustrates an example user interface provided by the management apparatus according to an exemplary embodiment of the present invention.

FIG. 33 illustrates an example user interface provided by the management apparatus according to an exemplary embodiment of the present invention.

FIG. 34 is a flowchart illustrating an example procedure of data processing performed by the management apparatus according to an exemplary embodiment of the present invention.

FIG. 35 illustrates an example memory map of a storage medium storing various data processing programs readable by the management apparatus according to an exemplary embodiment of the present invention.

DETAILED DESCRIPTION OF THE EMBODIMENTS

Figure 1:
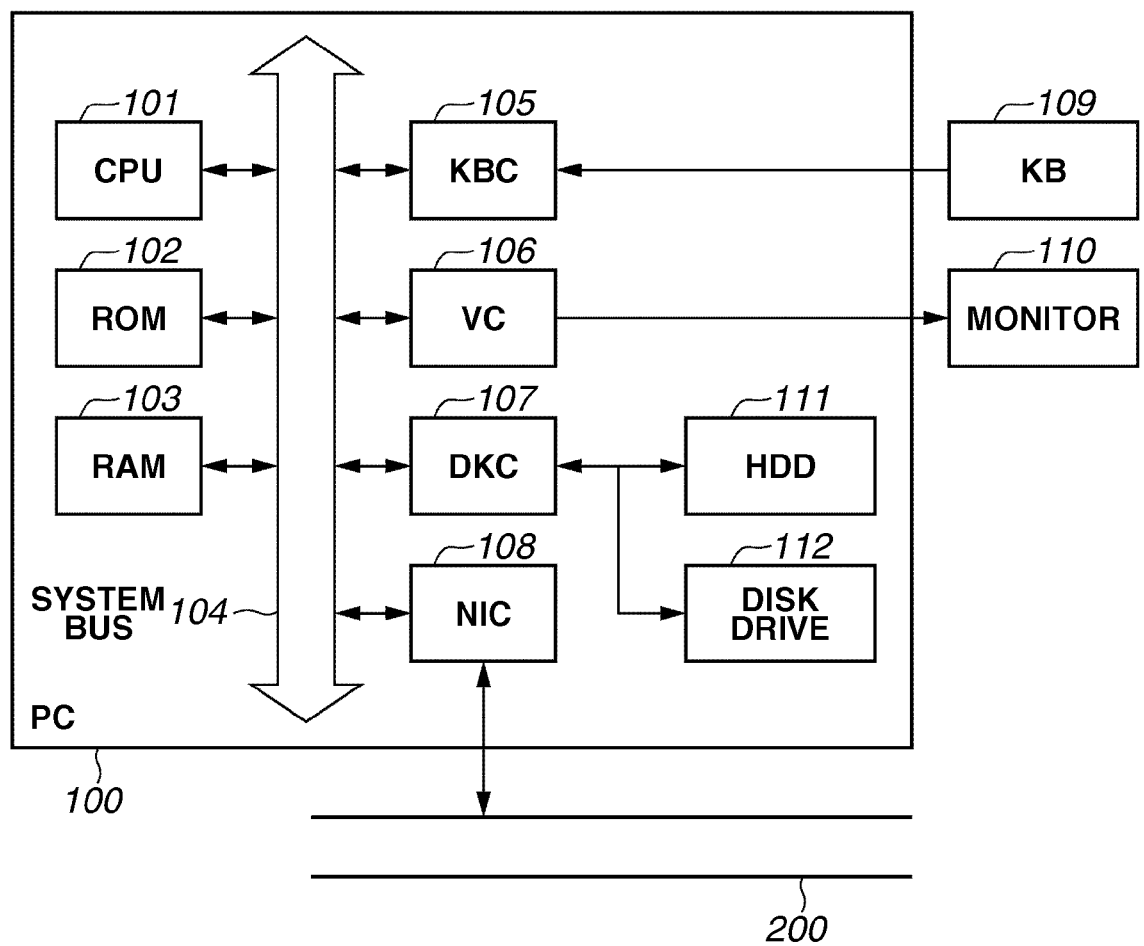
FIG. 1 is a block diagram illustrating an example information processing apparatus constituting a management system according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Various exemplary embodiments, features, and aspects of the invention will be described in detail below with reference to the drawings.

In the following exemplary embodiments, a module executing device resource conflict avoidance processing (hereinafter, referred to as "conflict avoidance processing unit") can be realized as part of functions of a device management application that operates on a management apparatus. The conflict avoidance processing unit can manage a conflict if it occurs among device resources, and can perform exclusive control and device resource shared settings.

In an exemplary embodiment of the present invention, a plurality of plugins can be added to one application, and the conflict avoidance processing unit realized by the application manages plugin functions.

However, the present invention can be realized by separately installing, as a dedicated application, the conflict avoidance processing unit configured to manage a conflict relationship between application functions when two or more applications are installed on the management apparatus. Alternatively, one of a plurality of applications installed on the management apparatus (e.g., an application capable of managing the limit of usage) can realize the conflict avoidance processing unit, which manages the conflict relationship among the functions of all applications installed on the management apparatus.

The present system can be realized using conflict avoidance software, which operates on an information processing apparatus such as a personal computer (hereinafter, referred to as "PC") and on an image forming device such as a multifunction peripheral (MFP), a copying machine, or a printer, which are separately disposed.

FIG. 1 is a block diagram illustrating an example information processing apparatus (PC 100) constituting a management system according to a first exemplary embodiment of the present invention.

In FIG. 1, a central processing unit (CPU) 101 is associated with a random access memory (RAM) 103 that can function as a work memory. The CPU 101 executes programs stored in a read only memory (ROM) 102 and a hard disk drive (HDD) 111, controls constituent components described below via a system bus 104, and executes conflict avoidance processing described below.

The HDD 111 stores various programs including an operating system (OS) and the above-described conflict avoidance software as well as relevant data to be processed. The conflict avoidance software can be supplied using a storage medium, such as a compact disc—ROM (CD-ROM), which is mountable on a disk drive 112.

The CPU 101 can access the HDD 111 and the disk drive 112 via a disk controller (DKC) 107, to install the conflict avoidance software on the HDD 111.

The CPU 101 controls a monitor 110 via a video card (VC) 106 according to a program loaded to the RAM 103 to display a user interface (UI) on the monitor 110.

Users can operate a pointing device, such as a keyboard (KB) 109 and a mouse, to input instructions and various data using the UI. The CPU 101 can receive user's instructions and data entered via a keyboard controller (KBC) 105 and execute various processing according to the user's instruction and the received data.

The CPU 101 can communicate, via a network interface card (NIC) 108, with other PCs, servers, MFPs, printers, and copying machines connected to a network 200.

Figure 2:
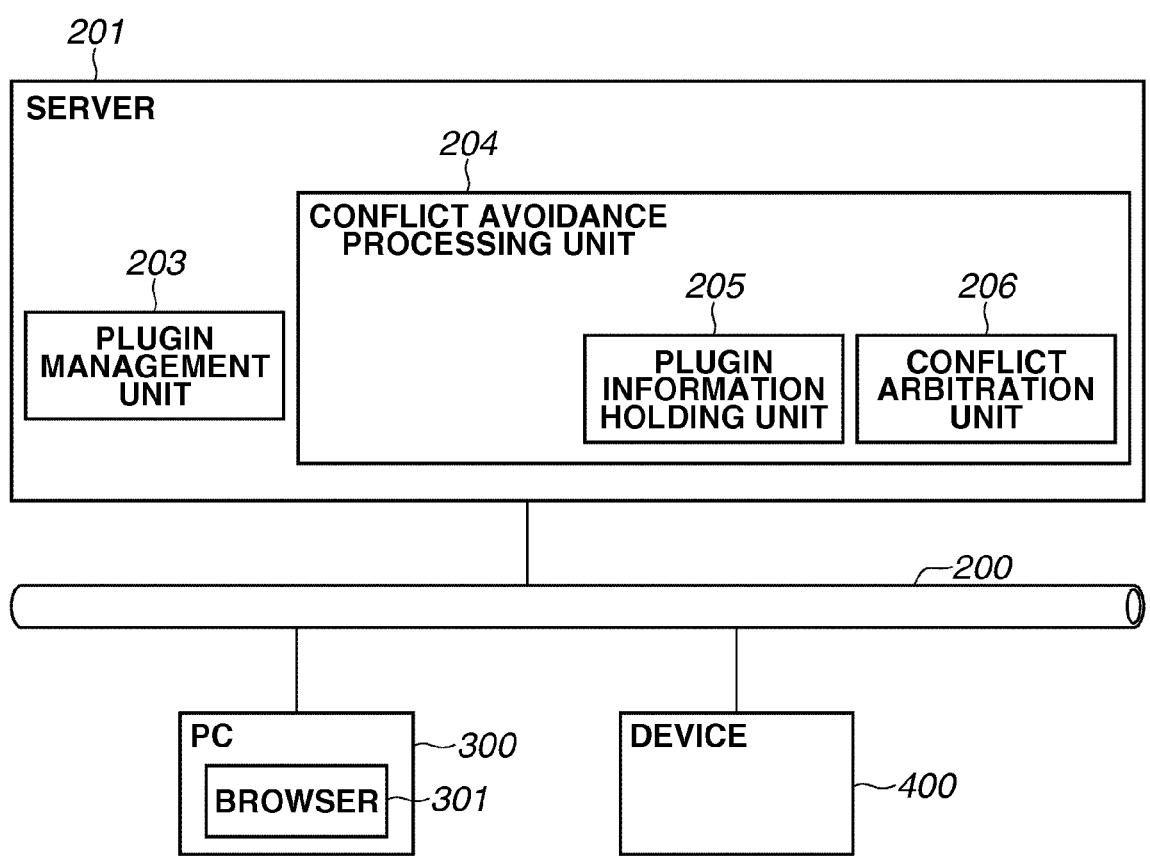
FIG. 2 is a block diagram illustrating an example management system according to an exemplary embodiment of the present invention.

FIG. 2 is a block diagram illustrating an example management system according to the present exemplary embodiment.

In FIG. 2, a server 201 includes the hardware resources illustrated in FIG. 1 and executes applications under the management of the operating system (OS) installed, to perform data processing, communication processing, and application conflict detection processing. The server 201 executes a device integrated management application to perform conflict arbitration processing for the installed resources, as described below.

A plugin management unit 203 includes a function of installing a plugin to be added to the device integrated management application and a function of managing the added plugin. A conflict avoidance processing unit 204 can be realized as a partial function of the device integrated management application. The conflict avoidance processing unit 204 has a function of detecting, managing, and arbitrating any functional conflict between basic device management functions of the device integrated management application and newly provided functions of the additional plugin.

A plugin information holding unit 205 has a function of storing the basic device management functions of the device integrated management application and the status (effective/ineffective) of various device resources (newly provided functions of the additional plugin).

A conflict arbitration unit 206 has a function of arbitrating any conflict occurring between the device resources based on the information stored in the plugin information holding unit 205.

A personal computer (PC) 300 is a PC that a system administrator can operate. The PC 300 includes the hardware resources illustrated in FIG. 1, and executes applications under the management of the installed OS to perform data processing and communication processing. A browser functioning as browsing software is installed on the PC 300. The browser enables the system administrator to use functions provided by the integrated management application of the server 201.

A device 400 is a MFP having a scanner function, a printer function, and a facsimile function in addition to a copy function.

A browser 301 of the PC 300 enables the system administrator to activate the device integrated management application that can operate on the server 201. The system administrator can manage the device 400 using the functions provided by the device integrated management application.

Figure 3:
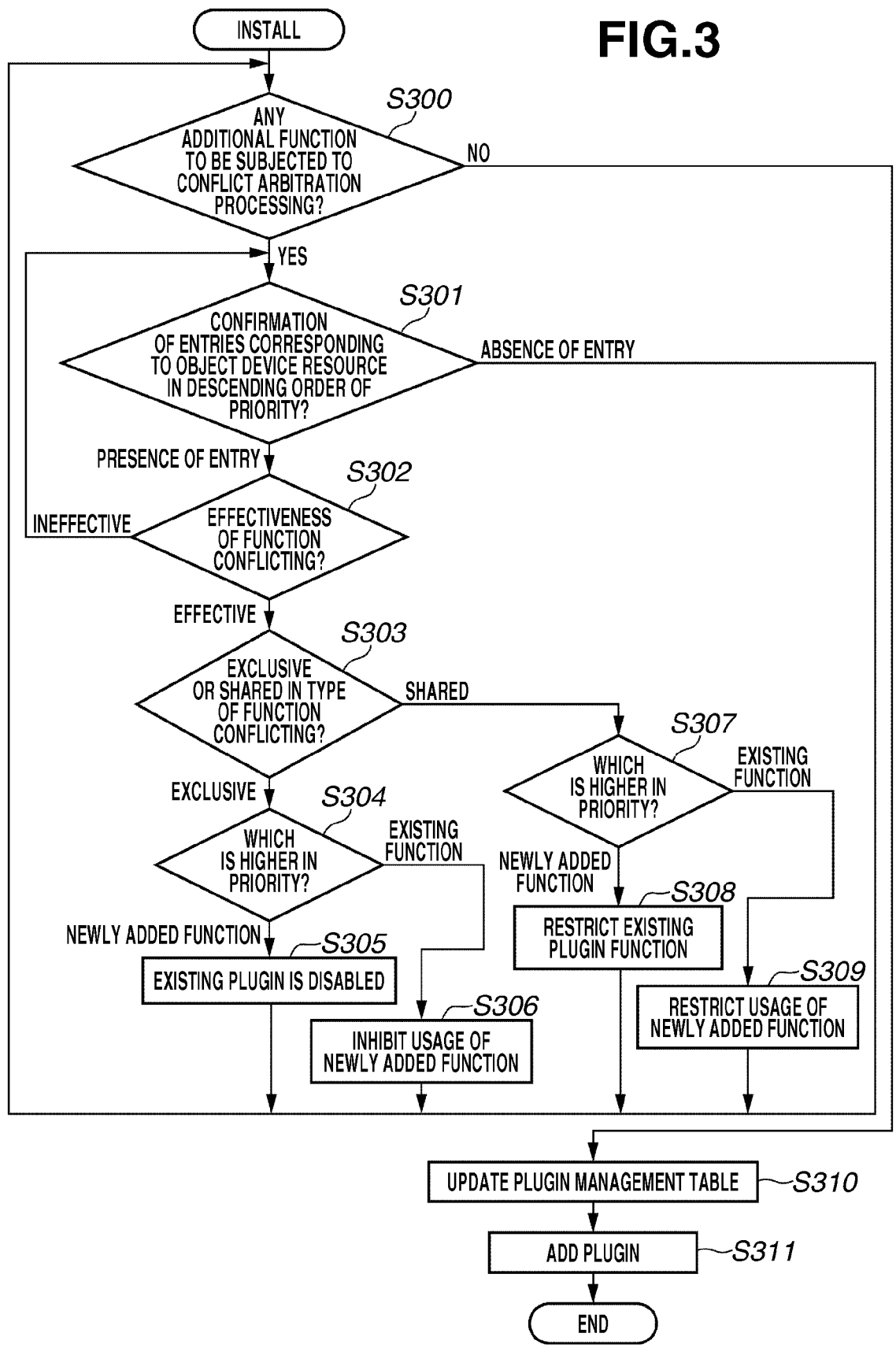
FIG. 3 is a flowchart illustrating an example procedure of data processing performed by the management apparatus according to an exemplary embodiment of the present invention.

FIG. 3 is a flowchart illustrating an example procedure of data processing performed by the management apparatus according to the present exemplary embodiment. The data processing illustrated in FIG. 3 is conflict arbitration processing performed when the server 201 installs an additional plugin to be added to the device integrated management application. To realize each step of the flowchart illustrated in FIG. 3, the CPU 101 of the server 201 executes the device integrated management application loaded to the RAM 103.

In the present exemplary embodiment, objects to be subjected to the conflict arbitration processing are a plugin A and a plugin B (i.e., new functions to be added to the device integrated management application). The plugin A is capable of managing the number of printable sheets for each user. The plugin B is capable of restricting usable device functions for each user. The setting by the plugin A is different from the setting by the plugin B. The plugin A and the plugin B are in a mutually conflicting relationship in their functions. One of two different settings is referred to as a first setting and another is referred to as a second setting.

The plugin A includes a function of setting the number of printable sheets in a color printing/monochrome printing for each user. If the administrator operates the browser 301 of the PC 300 to set the number of color printable sheets to 300 using the function of the plugin A, the plugin A attempts to set the device resource "number of remaining color printable sheets" to 300.

The plugin B includes a function of setting "color print inhibited" and "Fax transmission inhibited" for each user as settings for restricting the use of functions provided by the device. If the administrator sets the "color print inhibited" using the function of the plugin B, the plugin B attempts to set the device resource "number of remaining color printable sheets" to "0."

First, the administrator operates the browser 301 of the PC 300 to activate the device integrated management application on the server 201. The administrator instructs installation of an installation package of the plugin A using an additional plugin installation function provided by the device integrated management application. The installation package includes a set of a plugin and plugin information, where the plugin executes predetermined functions.

FIG. 4 illustrates example plugin information included in a plugin installation package managed by the server 201 illustrated in FIG. 1. The plugin illustrated in FIG. 4 is the plugin A.

The plugin information illustrated in FIG. 4 includes five items of (1) plugin name, (2) function name, (3) device resource (setting object), (4) exclusive/shared, and (5) priority order.

More specifically, the device resource (setting object) item (3) indicates device resources relating to the settings realized by the installed plugin (plugin A). For example, to perform restricted printing and set a print upper-limit value, an appropriate device resource (e.g., "number of remaining printable sheets") can be designated.

The exclusive/shared item (4) indicates whether the device resource (setting object) can be shared with other function(s) or needs to be exclusively used.

The priority order item (5) indicates a priority order to be referred to, if the device resource (setting object) conflicts with the other function(s), to determine whether to prioritize the device resource (setting object) over other function(s). When the value of the priority order is small, the device resource has a higher priority order. According to the example illustrated in FIG. 4, a "color upper-limit value setting" function of the plugin A exclusively uses a device resource "number of remaining color printable sheets."

FIGS. 5 and 6 illustrate example plugin management tables stored in the plugin information holding unit 205 illustrated in FIG. 2.

The plugin management table illustrated in FIG. 5 can be used to manage plugin information of existing plugins.

The plugin management table includes seven items of (1) plugin ID, (2) plugin name, (3) function name, (4) device resource (setting object), (5) exclusive/shared, (6) priority order, and (7) effective/ineffective.

The plugin ID item (1) can be automatically allocated by the device integrated management application when each plugin is installed.

The effective/ineffective item (7) indicates whether the function is currently effective or ineffective.

According to the example illustrated in FIG. 5, two plugins P1 and P2 are already existing in the device integrated management application. The plugin P1 includes a function F1 that uses a device resource R1. The plugin P2 includes a function F2 that uses a device resource R2.

The plugin management unit 203 of the server 201 illustrated in FIG. 2 receives a plugin installation instruction via the browser 301 of the PC 300 and sends plugin information to the conflict avoidance processing unit 204. In response to the plugin installation instruction, the plugin management unit 203 requests the conflict avoidance processing unit 204 to arbitrate the device resources.

In step S300, the conflict arbitration unit 206 determines whether there is any additional function to be subjected to the conflict arbitration processing. More specifically, the conflict arbitration unit 206 compares the "device resource (setting object)" included in the plugin information of the plugin A with the "device resource (setting object)" in each entry of the plugin management table stored in the plugin information holding unit 205. As a result of the above-described comparison, the conflict arbitration unit 206 confirms that the plugin management table does not store any device resource conflicting with the device resource used by the plugin A.

Therefore, the conflict arbitration unit 206 determines that no conflicting plugin function is detected. The processing proceeds to step S310 in which the conflict arbitration unit 206 updates the plugin management table. More specifically, if the conflict arbitration unit 206 does not detect any conflict between compared resources, storing all values usable for respective resources does not cause any problems.

FIG. 6 illustrates an example plugin management table having been updated.

FIG. 6 indicates that a "color printable sheet number setting (i.e., color upper-limit value setting)" function and a "monochrome print sheet setting (i.e., monochrome upper-limit value setting)" function of the plugin A are both effective.

After completing the above-described device resource conflict arbitration processing, the conflict avoidance processing unit 204 sends the arbitration result to the plugin management unit 203.

In step S311, the plugin management unit 203 continues installing the plugin A so that the functions of the plugin A can be used as part of the device integrated management application. Then, the plugin management unit 203 terminates the processing of this routine.

Next, the administrator instructs installation of the plugin B to be added to the device integrated management application via the browser 301 of the PC 300.

FIG. 7 illustrates example plugin information managed by the server 201 illustrated in FIG. 1.

The example illustrated in FIG. 7 is plugin information of the plugin B, which indicates that a "color print restricting" function of the plugin B exclusively uses the device resource "number of remaining color printable sheets."

In step S300, the conflict arbitration unit 206 compares the "device resource (setting object)" included in the plugin information of the plugin B (see FIG. 7) with the "device resource (setting object)" in each entry of the plugin management table (see FIG. 6) stored in the plugin information holding unit 205. Through the comparison of the resources, the conflict arbitration unit 206 can determine whether the device resource "number of remaining color printable sheets" of the "color print restricting" function of the plugin B accords with a corresponding resource of the "color upper-limit value setting" function of the plugin A. In this case, the conflict arbitration unit 206 determines that the compared resources are identical with each other. More specifically, the determination result in step S300 becomes YES. The processing proceeds to step S301.

In step S301, if the conflict avoidance processing unit 204 receives an arbitration request, the conflict arbitration unit 206 searches the plugin management table for a changed function and confirms a corresponding device resource. The conflict arbitration unit 206 confirms the entries of various functions that use the identified device resource in descending order of priority. If the conflict arbitration unit 206 determines that the entries corresponding to the object device resource are confirmed in descending order of priority, the processing proceeds to step S302. Otherwise, the processing proceeds to step S310.

In step S302, the conflict arbitration unit 206 determines whether the "color upper-limit value setting" function of the plugin A, which conflicts with the "color print restricting" function of the plugin B, is effective or ineffective, based on the plugin management table (see FIG. 6).

If the conflict arbitration unit 206 determines that the "color upper-limit value setting" function of the plugin A is ineffective and there is not any other conflicting function, the conflict arbitration unit 206 determines that a "color print inhibited" setting function of the plugin B is effective and updates the plugin management table. Then, the plugin management unit 203 installs the plugin B.

If in step S302 the conflict arbitration unit 206 determines that the "color upper-limit value setting" function of the plugin A is effective, the processing proceeds to step S303. As illustrated in FIG. 6, the "color upper-limit value setting" function of the plugin A is currently effective. Then, in step S303, the conflict arbitration unit 206 determines whether the "color upper-limit value setting" function of the plugin A is exclusive or shared referring to the plugin management table (see FIG. 6). If the conflict arbitration unit 206 determines that the "color upper-limit value setting" function is exclusive, the conflict arbitration unit 206 refers to the plugin information (see FIG. 7) of the plugin B and a value in the "priority order" item in the plugin management table (see FIG. 6).

In step S304, the conflict arbitration unit 206 determines which has a higher priority between the "color print restricting" function of the plugin B and the "color upper-limit value setting" function of the plugin A. If the conflict arbitration unit 206 determines that the "color print restricting" function of the plugin B has a higher priority, the processing proceeds to step S305. In step S305, the conflict arbitration unit 206 determines that, if the "color print restricting" function of the plugin B is enabled, the "color upper-limit value setting" function of the plugin A (i.e., existing plugin) is disabled.

If in step S304 the conflict arbitration unit 206 determines that the "color upper-limit value setting" function of the plugin A has a higher priority, the processing proceeds to step S306.

In step S306, the conflict arbitration unit 206 inhibits the usage of the "color print restricting" function of the plugin B (or sets the "color print restricting" function of the plugin B as ineffective), for example by using a gray-out display on the setting screen to prevent the user from selecting the "color print restricting" function of the plugin B. Then, the processing returns to step S300.

Then, in step S300, after completing the conflict arbitration for all functions of the plugin B, the plugin management unit 203 causes the browser 301 of the PC 300 (installation instruction source) to display the arbitration result.

If there is any existing plugin function that becomes ineffective because of the currently installed plugin, a warning message illustrated in FIG. 8 can be displayed on the browser 301 of the PC 300.

If the administrator does not want to disable the existing function, the administrator can turn the conflicting function off and can continue the installation. If any function that cannot be used for the currently installed plugin is detected as a result of the conflict arbitration processing, a warning message illustrated in FIG. 9 can be displayed on the browser 301 of the PC 300.

In step S310, the plugin management unit 203 sends an administrator's function selection result to the conflict avoidance processing unit 204. The conflict avoidance processing unit 204 updates the plugin management table based on the administrator's function selection result. In step S311, the plugin management unit 203 continues installing the plugin B so that the functions of the plugin B can be used as part of the device integrated management application. Then, the plugin management unit 203 terminates the processing of this routine.

Accordingly, for example, when both an existing plugin and a newly added plugin include a function of setting the number of color printable sheets, the device resource can be used as a shared (not exclusive) one.

If in step S303 the conflict arbitration unit 206 determines that the "color upper-limit value setting" function of the plugin A is shared, then in step S307, the conflict arbitration unit 206 determines which has a higher priority between conflicting functions of the existing plugin and the newly added plugin.

If in step S307 the conflict arbitration unit 206 determines that the conflicting function of the newly added plugin has a higher priority, the processing proceeds to step S308. Then, in step S308, the conflict arbitration unit 206 determines that, if the conflicting function of the newly added plugin is enabled, the conflicting function of the existing plugin is subordinate to the content set by the newly added plugin. In this case, if the number of color printing sheets is set to 100 by the existing plug in, the number of color printing sheets of the newly added plugin is automatically set to 100.

If in step S307 the conflict arbitration unit 206 determines that the conflicting function of the existing plugin has a higher priority, the processing proceeds to step S309 in which the conflict arbitration unit 206 determines that the conflicting function of the newly added plugin is subordinate to the content set by the existing plugin.

Next, an example arbitration for plugins conflicting with each other, which is performed when the setting change of the installed plugin has changed a state of conflict between device resources, is described below with reference to a flowchart illustrated in FIG. 10.

Figure 10:
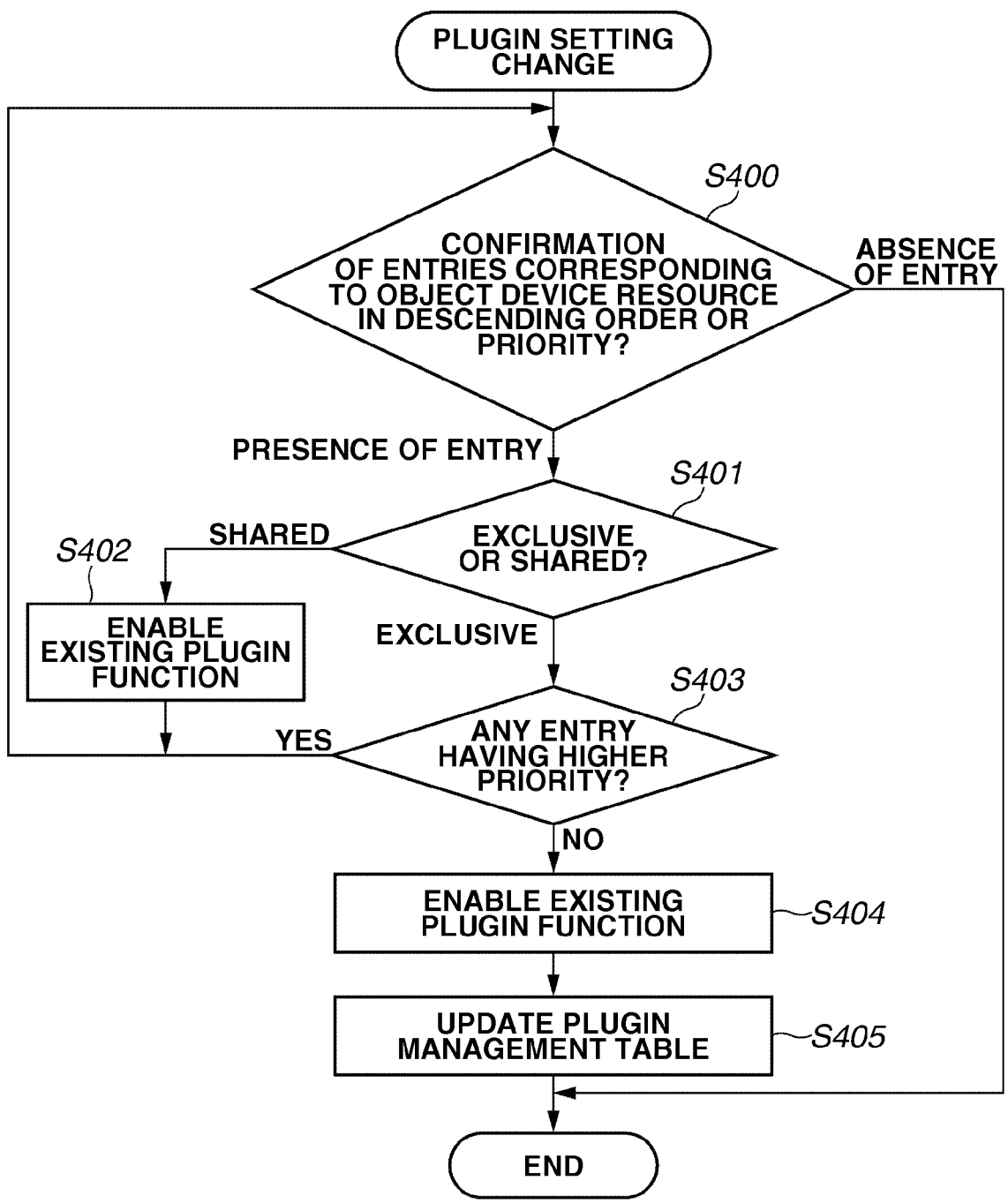
FIG. 10 is a flowchart illustrating an example procedure of data processing performed by the management apparatus according to an exemplary embodiment of the present invention.

FIG. 10 is a flowchart illustrating an example procedure of data processing performed by the management apparatus according to the present exemplary embodiment. The data processing illustrated in FIG. 10 is conflict arbitration processing performed in response to any change in settings after an additional plugin is incorporated in the device integrated management application of the server 201. To realize each step of the flowchart illustrated in FIG. 10, the CPU 101 of the server 201 executes the device integrated management application loaded to the RAM 103.

As an example conflict arbitration, it is now assumed that the plugin A capable of managing the number of printable sheets for each user and the plugin B capable of restricting usable device functions for each user are both installed in a device integrated management system, as indicated in the plugin management table illustrated in FIG. 11.

FIG. 11 illustrates an example plugin management table managed by the management apparatus according to the present exemplary embodiment.

As illustrated in FIG. 11, the plugin management table presently indicates that the "color upper-limit value setting" function of the plugin A conflicts with the "color print restricting" function of the plugin B. The plugin management table further indicates that the "color upper-limit value setting" function of the plugin A is ineffective and the "color print restricting" function of the plugin B is effective.

It is further assumed that, on the device integrated management system, the administrator changes the "color print restricting" function of the plugin B to ineffective. Namely, the processing performed when a setting of the function that uses the device resource has changed and when re-arbitration for the device resources is requested is described below. In this case, the plugin management unit 203 sends the change of the plugin function to the conflict avoidance processing unit 204 and requests the conflict avoidance processing unit 204 to perform the arbitration for the device resources again.

In step S400, if the conflict avoidance processing unit 204 receives an arbitration request, the conflict arbitration unit 206 searches the plugin management table for a changed function, confirms a corresponding device resource, and confirms entries of functions that use the identified device resource in descending order of priority. If the entries of the functions that use the identified device resource are not confirmed in descending order of priority, for example, when there is no entry, the conflict arbitration unit 206 terminates the processing of this routine.

If in step S400 it is determined that the entries of the functions that use the identified device resource are confirmed in descending order of priority, the processing proceeds to step S401.

Then, in step S401, the conflict arbitration unit 206 determines whether the target function is exclusive or shared referring to the plugin management table. If the conflict arbitration unit 206 determines that the target function is shared, then in step S402, the conflict arbitration unit 206 enables the target function and the processing returns to step S400 to confirm the presence of a function having the next higher priority.

If in step S401 the conflict arbitration unit 206 determines that the target function is exclusive, then in step S403, the conflict arbitration unit 206 determines whether there is any entry having a higher priority. According to the example table illustrated in FIG. 11, the "color upper-limit value setting" function of the plugin A (i.e., the conflicting function) is exclusive, and any function searched in step S400 does not have a priority higher than that of the "color upper-limit value setting" function of the plugin A. Therefore, the determination in step S403 becomes NO and the processing proceeds to step S404.

Then, in step S404, the conflict arbitration unit 206 enables the "color upper-limit value setting" function of the plugin A. In step S405, the conflict arbitration unit 206 updates the plugin management table (see FIG. 11). More specifically, the conflict arbitration unit 206 disables the "color print restricting" function of the plugin B and enables the "color upper-limit value setting" function of the plugin A. Then, the conflict arbitration unit 206 terminates the processing of this routine.

Thus, the "color upper-limit value setting" function of the plugin A becomes usable.

In the exemplary embodiment, the setting change of an installed plugin can resolve the conflict state. Similarly, the present exemplary embodiment can be applied to a case where the setting change of the installed plugin newly causes a conflict state.

Figure 12:
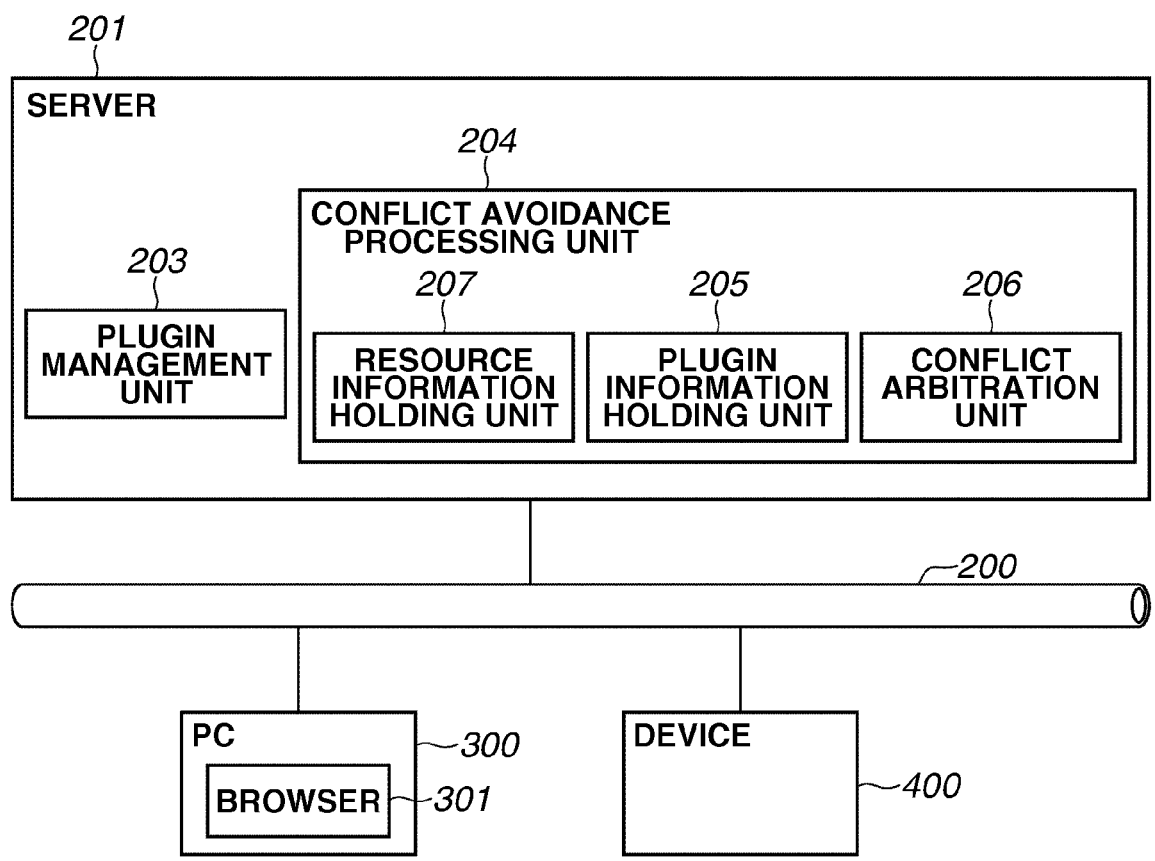
FIG. 12 is a block diagram illustrating an example management system according to an exemplary embodiment of the present invention.

FIG. 12 is a block diagram illustrating an example management system according to a second exemplary embodiment. Constituent elements similar to those illustrated in FIG. 2 are denoted by the same reference numerals and not described below. The device integrated management application operates on the server 201 as described with reference to FIG. 2.

The conflict avoidance processing unit 204 illustrated in FIG. 12 includes a resource information holding unit 207 that has a function of storing information of device resources (i.e., arbitration objects) and device resource conflict information.

As an example conflict arbitration, it is now assumed that both the plugin A capable of managing the number of printable sheets for each user and the plugin B capable of performing accounting management are both incorporated in the device integrated management application.

The plugin A has a function of setting the number of printable sheets in color printing/monochrome printing for each user. The "color upper-limit value setting" function of the plugin A uses a value set on the device integrated management application as a value for the device resource "number of remaining color printable sheets."

A "monochrome upper-limit value setting" function of the plugin A uses a value set on the device integrated management application as a value for a device resource "number of remaining monochrome printable sheets."

An "accounting management" function of the plugin B can set an upper-limit amount of money and an amount of money per sheet on the device integrated management application, and can calculate the number of printable sheets based on the set values and set the calculated value to the device resource "total number of remaining printable sheets."

The device integrated management application includes, beforehand, relevant information among device resources and processing to be performed in case of conflict, which are described in a table illustrated in FIG. 13.

FIG. 13 illustrates an example device resource management table, which stores relevant information among the device resources and operations to be performed in case of conflict, used by the management apparatus according to the present exemplary embodiment.

In FIG. 13, device resource management table includes items of (1) resource number, (2) device resource name, (3) relevant resource list, and (4) operation to be performed in case of conflict.

The relevant resource list includes a list of numbers indicating relevant device resources. According to the example illustrated in FIG. 13, two device resources of "total number of remaining printable sheets" and "number of remaining monochrome printable sheets" are indicated as device resources relating to the device resource "number of remaining color printable sheets" (see "relevant resource list" item).

The "operation to be performed in case of conflict" item describes operations to be performed in case of conflict among the device resources in association with the relevant resource list.

The "operation to be performed in case of conflict" item of the device resource "number of remaining color printable sheets" (indicated by the resource number "1" illustrated in FIG. 13) describes processing for calculating the total number of sheets and the number of color sheets as settings (1) and (2) in descending order of priority.

More specifically, in the "operation to be performed in case of conflict" item of the device resource "number of remaining color printable sheets" (indicated by the resource number "1" in FIG. 13), if the function that uses the device resource "number of remaining color printable sheets" has a higher priority, the device resource "total number of remaining printable sheets" is subordinate to other device resources of "number of remaining color printable sheets" and "number of remaining monochrome printable sheets" and is calculated as a sum of them.

If the function that uses the device resource "number of remaining color printable sheets" has a lower priority, the device resource "number of remaining color printable sheets" is subordinate to other device resources of "total number of remaining printable sheets" and "number of remaining monochrome printable sheets" and is calculated as a difference between them.

The device resource information table having been set in this manner is stored in the resource information holding unit 207 of the device integrated management application.

Similarly, the "operation to be performed in case of conflict" item of the device resource "number of remaining monochrome printable sheets" (indicated by the resource number "2" in FIG. 13) describes processing for calculating the total number of sheets and the number of monochrome sheets as settings (1) and (2) in descending order of priority.

Moreover, the "operation to be performed in case of conflict" item of the device resource "total number of remaining printable sheets" (indicated by resource number "3" in FIG. 13) describes processing for calculating the total number of sheets, the number of color sheets, and the number of monochrome sheets. More specifically, settings (1)-1, (1)-2, (1)-3, and (2) are described in descending order of priority, although the priority of color is identical to the priority of monochrome in the setting (1)-2.

Figure 14:
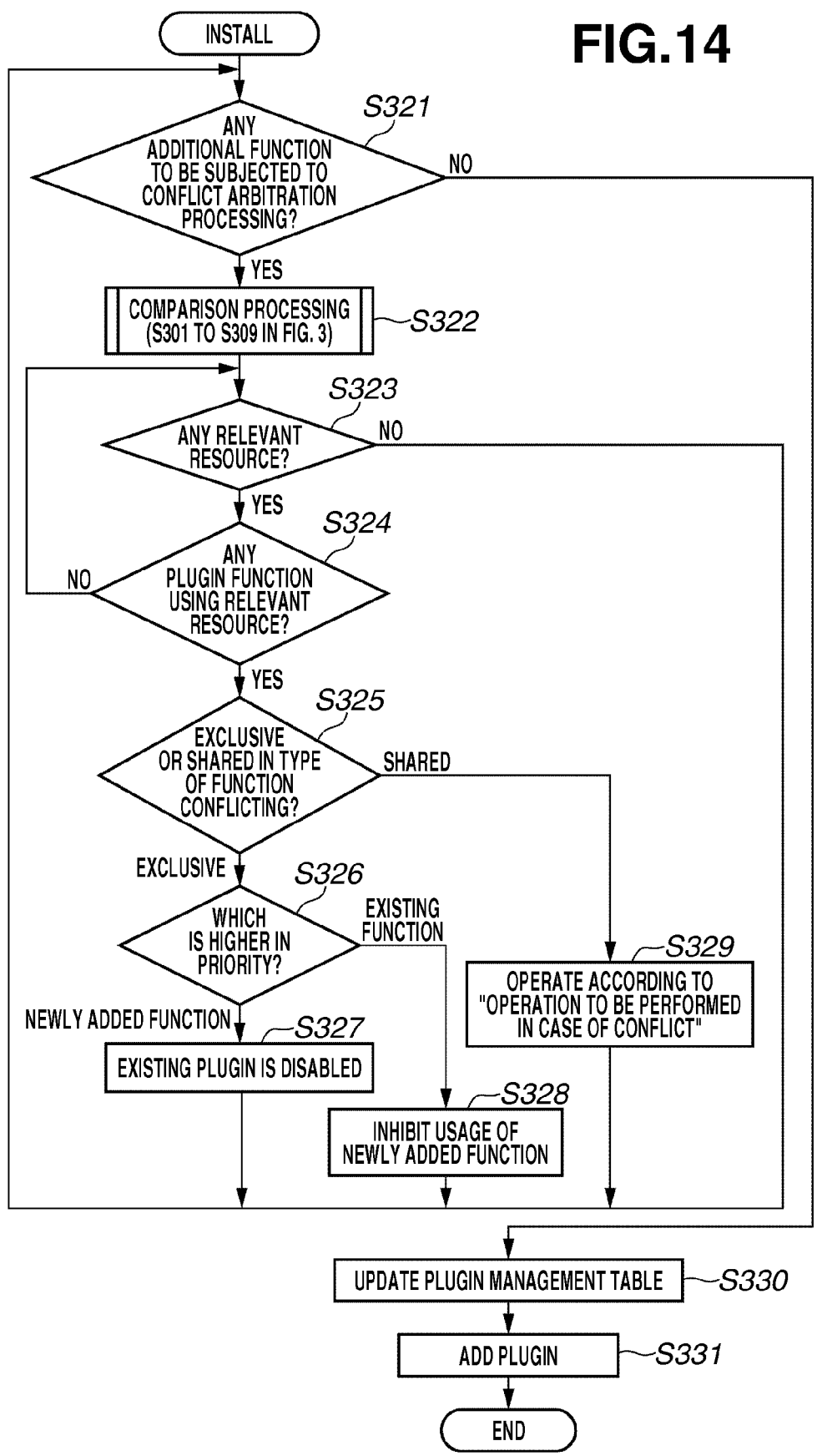
FIG. 14 is a flowchart illustrating an example procedure of data processing performed by the management apparatus according to an exemplary embodiment of the present invention.

FIG. 14 is a flowchart illustrating an example procedure of data processing performed by the management apparatus according to the present exemplary embodiment. The data processing illustrated in FIG. 14 is conflict arbitration processing performed when an additional plugin is incorporated in the device integrated management application of the server 201. To realize each step of the flowchart illustrated in FIG. 14, the CPU 101 of the server 201 executes the device integrated management application loaded to the RAM 103.

In a state where the plugin A is already installed, the plugin management table is in a state illustrated in FIG. 15.

FIG. 15 illustrates an example plugin management table managed by the management apparatus according to the present exemplary embodiment. The plugin management table illustrated in FIG. 15 includes an "operation" item in addition to the items of the plugin management table illustrated in FIG. 5. The "operation" item is described below in detail. In this state, the administrator instructs the device integrated management application to install the plugin B.

In step S321, the conflict arbitration unit 206 determines whether there is any additional function to be subjected to the conflict arbitration processing. If the conflict arbitration unit 206 determines that there is not any additional function to be subjected to the conflict arbitration processing, the processing proceeds to step S330. If the conflict arbitration unit 206 determines that the additional function to be subjected to the conflict arbitration processing is present, the processing proceeds to step S322.

In step S322, the conflict arbitration unit 206 compares the "device resource (setting object)" included in the plugin information of the plugin B with the "device resource (setting object)" in each entry of the plugin management table stored in the plugin information holding unit 205. FIG. 16 illustrates the plugin information of the plugin B. FIG. 15 illustrates the plugin management table.

According to the above-described conditions, in the present exemplary embodiment, the conflict arbitration unit 206 determines that there is no plugin function conflicting with other function as a comparison result in step S322.

In step S323, the conflict arbitration unit 206 determines whether there is any relevant resource based on the following processing. The conflict arbitration unit 206 checks the presence of any resource relating to the "device resource (setting object)" included in the plugin information of the plugin B (see FIG. 16), by collating with the "resource number" item and the "relevant resource list" item of the device resource management table (see FIG. 13). If the conflict arbitration unit 206 determines that the relevant resource is not present, the processing returns to step S321. Then, similar to the first exemplary embodiment, in step S330, the conflict avoidance processing unit 204 updates the plugin management table. In step S331, the plugin management unit 203 completes the installation of the plugin.

In the present exemplary embodiment, as a result of the collation in step S323, the conflict arbitration unit 206 determines that the resource relating to the device resource "total number of remaining printable sheets" ("device resource (setting object)" of the plugin B) is present.

Then, in step S324, the conflict arbitration unit 206 determines whether there is any plugin function that uses the relevant resource based on a comparison between the relevant resource and the "device resource (setting object)" in each entry of the plugin management table (see FIG. 15). In the present exemplary embodiment, there is a plugin function that uses the device resources of "number of remaining color printable sheets" and "number of remaining monochrome printable sheets", which relate to the device resource "total number of remaining printable sheets."

The plugin function that uses the device resource "number of remaining color printable sheets" is the "color upper-limit value setting" function of the plugin A. The plugin function that uses the device resource "number of remaining monochrome printable sheets" is the "monochrome upper-limit value setting" function of the plugin A.

If in step S324 the conflict arbitration unit 206 determines that the plugin function that uses the relevant resource is present, then in step S325, the conflict arbitration unit 206 determines whether the conflicting plugin function is exclusive or shared referring to the plugin management table.

If in step S325 the conflict arbitration unit 206 determines that conflicting plugin function is exclusive, the conflict arbitration unit 206 performs the processing of steps S326 to S328 to perform the conflict arbitration processing according to the priority of the plugin function, similar to the processing of steps S304 to S306 described in the first exemplary embodiment.

In the present exemplary embodiment, the "accounting management" function of the plugin B is shared.

If in step S325 the conflict arbitration unit 206 determines that conflicting plugin function is shared, the processing proceeds to step S329.

In step S329, the conflict arbitration unit 206 refers to the "operation to be performed in case of conflict" item of the device resource management table, which corresponds to the "device resource (setting object)" included in the plugin information of the plugin B (see FIG. 16). In the present exemplary embodiment, the conflict arbitration unit 206 refers to the "operation to be performed in case of conflict" corresponding to the device resource "total number of remaining printable sheets" that is used by the "accounting management" function of the plugin B. In the present exemplary embodiment, to determine an appropriate operation to be performed in case of conflict, the conflict arbitration unit 206 compares the priorities of the "accounting management" function of the plugin B, the "color upper-limit value setting" function of the plugin A, and the "monochrome upper-limit value setting" function of the plugin A. In this case, the function has a higher priority when the value of its priority order is smaller.

In the present exemplary embodiment, as illustrated in FIGS. 15 and 16, the "color upper-limit value setting" function of the plugin A and the "monochrome upper-limit value setting" function of the plugin A have the same priority which is higher than that of the "accounting management" function of the plugin B. Therefore, the setting (1)-2 of number 3 is applied as the "operation to be performed in case of conflict" illustrated in FIG. 13. The setting (1)-2 of number 3 is, as illustrated in FIG. 13, the operation to be performed when the priority of the "color upper-limit value setting" function of the plugin A is the same as the priority of the "monochrome upper-limit value setting" function of the plugin A. Accordingly, in step S329, the conflict arbitration unit 206 determines the setting (1)-2 of number 3 as the operation to be performed in case of conflict. Then, the processing returns to step S321.

If in step S321 the conflict arbitration unit 206 determines that the conflict arbitration processing has been completed for all functions of the plugin B, the plugin management unit 203 displays the arbitration result on the browser 301 of the PC 300 (installation instruction source).

The content displayed in this case is that the setting item of the "accounting management" function of the plugin B is subordinate to the setting items of the "color upper-limit value setting" function of the plugin A and the "monochrome upper-limit value setting" function of the plugin A.

The installation operation, which follows the warning message display, and the plugin management table updating processing are similar to those described in the first exemplary embodiment.

However, when the plugin management table is updated, reference information for the "operation to be performed in case of conflict" determined in step S329 is registered in the "operation" item of the plugin management table.

In the present exemplary embodiment, application of the setting (1)-2 of number 3 (the operation to be performed in case of conflict illustrated in FIG. 13) is registered to the "operation to be performed in case of conflict" item of the "accounting management" function of the plugin B, as the "operation to be performed in case of conflict" for the device resource "total number of remaining printable sheets."

Next, an example operation to be performed by the device integrated management application to set each plugin function after the plugin is installed is described with reference to a flowchart illustrated in FIG. 17.

Figure 17:
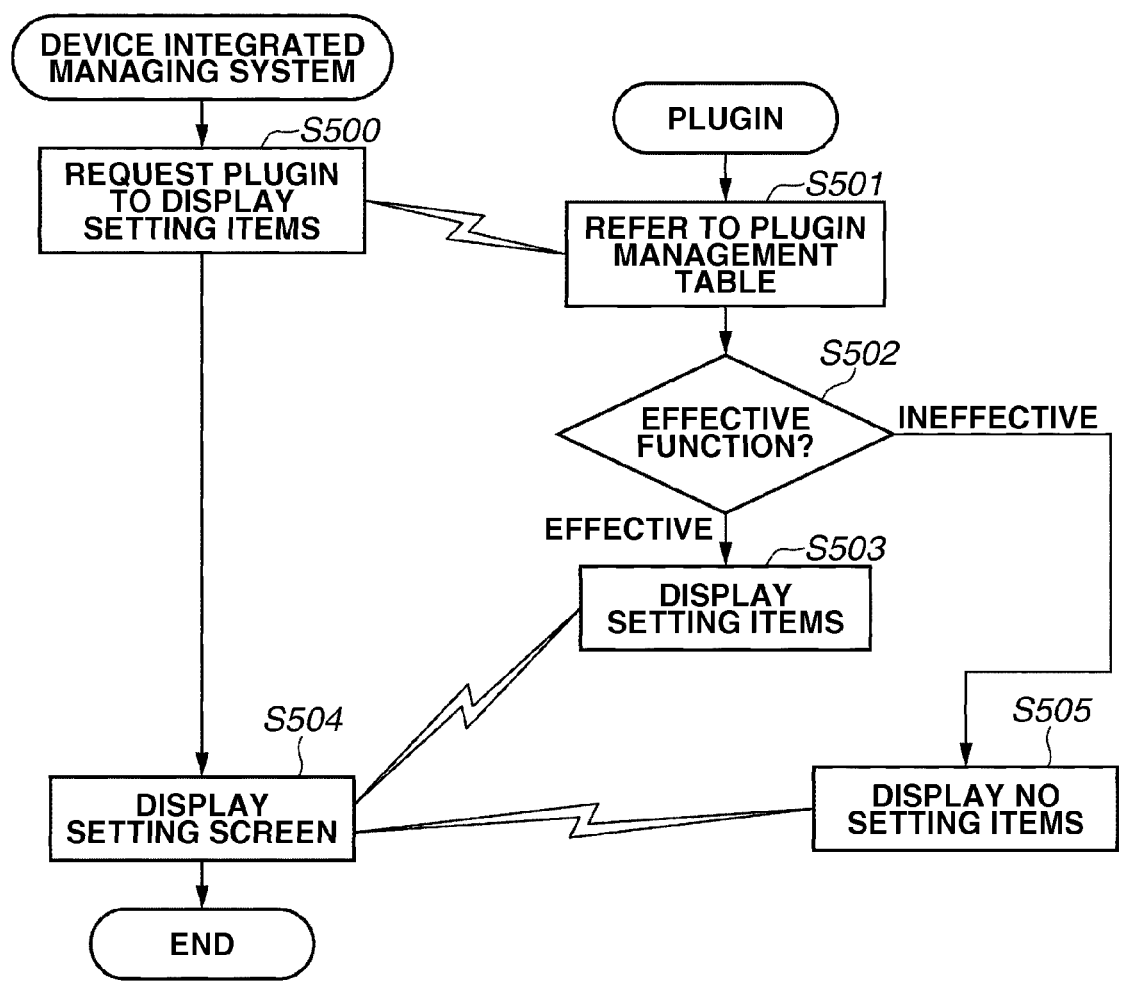
FIG. 17 is a flowchart illustrating an example procedure of data processing performed by the management apparatus according to an exemplary embodiment of the present invention.

FIG. 17 is a flowchart illustrating an example procedure of data processing performed by the management apparatus according to the exemplary embodiment of the present invention. The data processing illustrated in FIG. 17 is setting screen display processing performed by the device integrated management application of the server 201 and an additional plugin. To realize each step of the flowchart illustrated in FIG. 17, the CPU 101 of the server 201 executes the device integrated management application and the installed plugin loaded to the RAM 103.

Respective setting items of the "color upper-limit value setting" function of the plugin A, the "monochrome upper-limit value setting" function of the plugin A, and the "accounting management" function of the plugin B, which have been subjected to the above-described arbitration, are set on the same screen as illustrated in FIG. 18.

When the user information setting screen is displayed as illustrated in FIG. 18, setting item display areas for respective plugins are prepared on the setting screen of the device integrated management application, so that each plugin can display its own setting items in the prepared area. One of two different plugins illustrated in FIG. 18 is the plugin A that can set the upper-limit number of printing sheets approved when the print function is used. The other plugin is the plugin B that can set the upper-limit amount of money to be charged based on the usage of the print function.

More specifically, the administrator accesses the device integrated management application operating on the server 201 via the browser 301 of the PC 300, and requests the device integrated management application to display the setting screen.

In step S500, if the device integrated management application receives the administrator's request from the PC 300, the plugin management unit 203 requests each plugin to display the setting screen. In step S501, if each plugin receives the setting screen display request, the plugin refers to the plugin management table. Then, in step S502, the plugin checks effectiveness/ineffectiveness for each of its own functions. In step S503, the plugin displays effective functions in its own display area.

In step S504, if the display of all plugin display areas is completed, the device integrated management application displays the setting screen on the browser 301 of the PC 300 (instruction source of the setting screen display), and terminates the processing of this routine.

If in step S502 the plugin determines that the function is ineffective, then in step S505, the plugin does not display the setting items.

Figure 19:
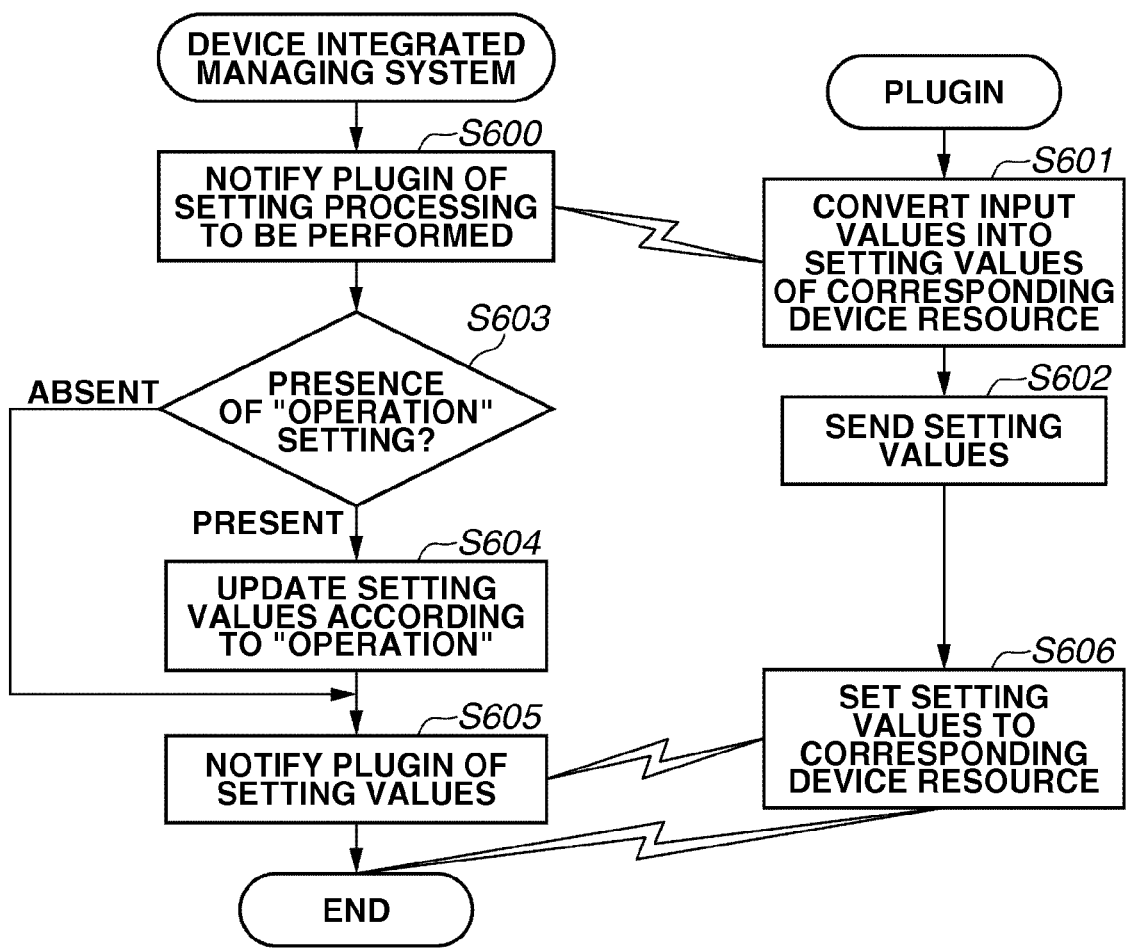
FIG. 19 is a flowchart illustrating an example procedure of data processing performed by the management apparatus according to an exemplary embodiment of the present invention.

FIG. 19 is a flowchart illustrating an example procedure of data processing performed by the management apparatus according to the present exemplary embodiment. The data processing illustrated in FIG. 19 is example processing to be performed when the administrator presses a "setting" button on the setting screen (see FIG. 18) to apply the setting to the device integrated management application. To realize each step of the flowchart illustrated in FIG. 19, the CPU 101 of the server 201 executes the device integrated management application and the plugin loaded to the RAM 103.

In the present exemplary embodiment, the administrator inputs a value "2000" in the "color upper-limit value setting (i.e., color upper-limit number of sheets)" item of the plugin A and a value "8000" in the "monochrome upper-limit value setting (i.e., monochrome upper-limit number of sheets)" item of the plugin A, on the setting screen (see FIG. 18). The administrator further inputs a value "1000" as an "amount of money charged" and a value "1" as a "price per page" for the "accounting management" settings of the plugin B. Then, the administrator presses the "setting" button.

If the device integrated management application receives a "setting" button pressing event, then in step S600, the device integrated management application instructs each plugin to perform setting processing. In response to the notification, in step S601, the plugin acquires input values entered in its one's own display area and converts the input values into setting values of the corresponding device resource.

In the present exemplary embodiment, the plugin converts the value 2000 entered in the "color upper-limit value setting (i.e., color upper-limit number of sheets)" item of the plugin A into a setting value "2000" for the corresponding device resource "number of remaining color printable sheets." The plugin further converts the value 8000 entered in the "monochrome upper-limit value setting (i.e., monochrome upper-limit number of sheets)" item of the plugin A into a setting value "8000" for the corresponding device resource "number of remaining monochrome printable sheets."

The plugin further converts the value 1000 in the "amount of money charged" item and the value "1" in the "price per page" item entered as the "accounting management" settings of the plugin B into a setting value "1000=1000 (yen)÷1 (yen/page)" for the corresponding device resource "total number of remaining printable sheets."

Next, in step S602, the plugin sends the converted value to the conflict arbitration unit 206 of the device integrated management application. In step S603, the conflict arbitration unit 206 refers to the "operation" item of the plugin management table and determines whether there is any "operation" setting. If the conflict arbitration unit 206 determines that there is not any operation setting, then in step S605, the conflict arbitration unit 206 directly returns the value received from the plugin in step S603 to the plugin.

If in step S603 the conflict arbitration unit 206 determines that there is the operation setting, the processing proceeds to step S604. Then, in step S604, the conflict arbitration unit 206 acquires, from the device resource management table, an operation setting corresponding to the reference information for the "operation to be performed in case of conflict" registered in the "operation" item of the plugin management table, and updates the setting values according to the operation setting having been set.

In the present exemplary embodiment, the conflict arbitration unit 206 updates the setting value of the device resource "total number of remaining printable sheets" set by the "accounting management" function of the plugin B based on the setting value 2000 for the device resource "number of remaining color printable sheets" of the plugin A and the setting value 8000 for the device resource "number of remaining monochrome printable sheets" of the plugin A.

The setting value for the device resource "total number of remaining printable sheets" set by the "accounting management" function of the plugin B is equal to a sum (=10000) of the setting value 2000 for the device resource "number of remaining color printable sheets" and the setting value 8000 for the device resource "number of remaining monochrome printable sheets."

Then, in step S605, the conflict arbitration unit 206 notifies the plugin of the setting values updated in step S604. In response to the notification, in step S606, the plugin performs internal processing on the setting values received in step S605 and sets setting values for a corresponding device resource.

In the present exemplary embodiment, input values entered for respective functions of the plugin A become setting values for the corresponding device resources and are set for the corresponding device. Regarding the "accounting management" function of the plugin B, the value converted in step S601 is different from the setting value notified in step S605. For example, to prioritize the setting value 10000 notified in step S605 over the value converted in step S601, the plugin performs processing for changing the "amount of money charged" to 10000 (yen) and the "price per page" to 1 (yen) and further sets 10000 in the device resource "total number of remaining printable sheets."

In the exemplary embodiment, the processing for changing input values into setting values for device resources is automatically performed. However, a warning display can be performed before executing the setting for the device resources.

A third exemplary embodiment of the present invention is described below. Constituent elements similar to those described in the first and second exemplary embodiments are denoted by the same reference numerals and not described below.

Figure 20:
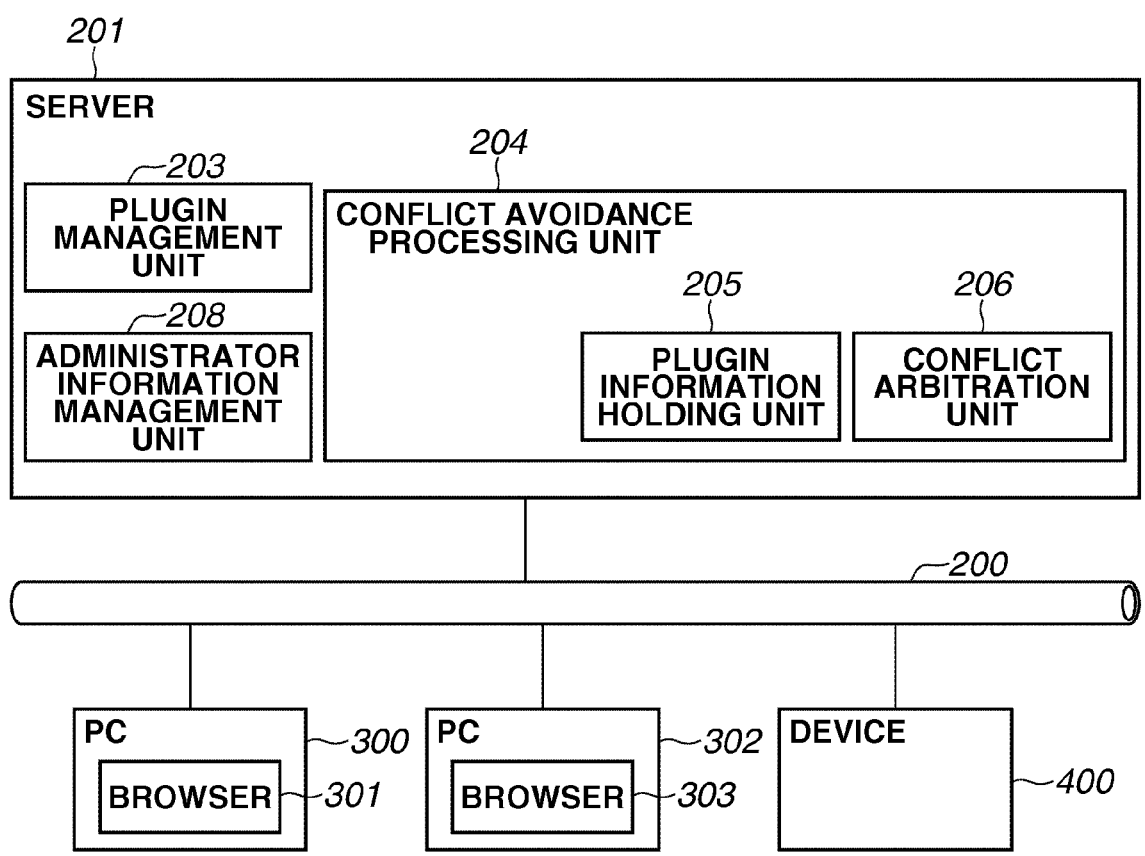
FIG. 20 is a block diagram illustrating an example management system according to an exemplary embodiment of the present invention.

FIG. 20 is a block diagram illustrating an example management system according to the third exemplary embodiment. Constituent elements similar to those illustrated in FIG. 2 are denoted by the same reference numerals. Similar to the first and second exemplary embodiments, the device integrated management application operates on the server 201.

In FIG. 20, an administrator information management unit 208 has a function of managing information relating to the system administrator who uses the device integrated management application and the plugin administrator.

The PC 300 and a PC 302 are personal computers that the system administrator can operate. The system administrator can access the device integrated management application operating on the server 201 via the browser 301 of the PC 300 or a browser 303 of the PC 302. The device integrated management application provides a function for enabling the system administrator to manage the device 400.

In the exemplary embodiment, it is now assumed that two or more system administrators are present for each plugin. An example method for avoiding any conflict among plugin functions is described below.

As an example conflict arbitration, it is now assumed that both the plugin A capable of managing the number of printable sheets for each user and the plugin B capable of performing device function usage restriction are both incorporated in the device integrated management application.

In the present system, the administrator of the plugin A is Manager A and the administrator of the plugin B is Manager B.

The plugin A has a function of setting the number of printable sheets in color printing/monochrome printing for each user. If the Manager A sets the number of color printable sheets to 300, the plugin A attempts to set the device resource "number of remaining color printable sheets" to 300.

The plugin B has a function of restricting usable device functions for each user. For example, "color print inhibited" and "Fax transmission inhibited" can be set for each user. If the Manager B sets the "color print inhibited", the plugin B attempts to set the device resource "number of remaining color printable sheets" to "0."

Figure 21:
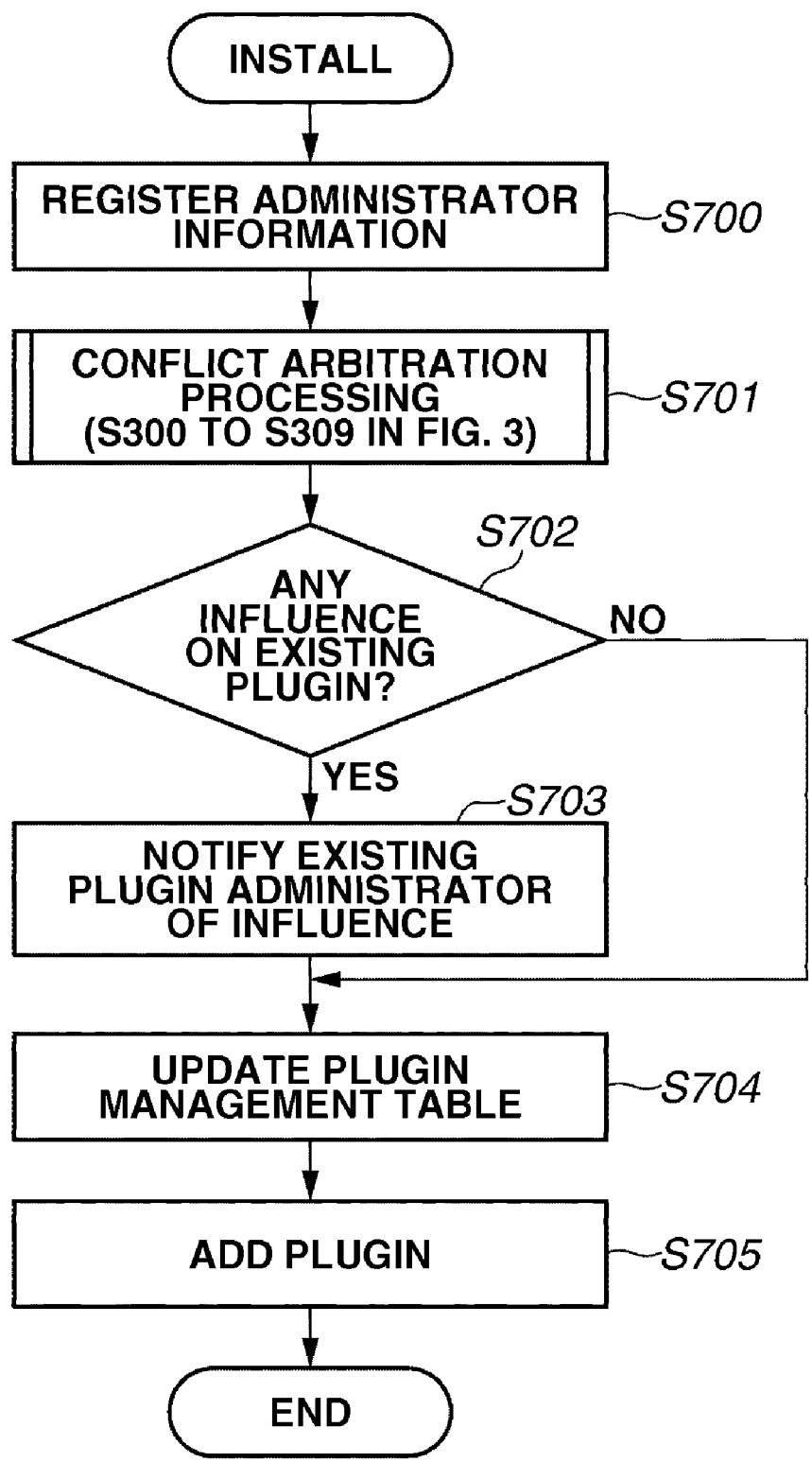
FIG. 21 is a flowchart illustrating an example procedure of data processing performed by the management apparatus according to an exemplary embodiment of the present invention.

FIG. 21 is a flowchart illustrating an example procedure of data processing performed by the management apparatus according to the present exemplary embodiment. The data processing illustrated in FIG. 21 is example information setting processing performed when an additional plugin is incorporated in the device integrated management application. To realize each step of the flowchart illustrated in FIG. 21, the CPU 101 of the server 201 executes the device integrated management application loaded to the RAM 103.

First, the Manager A accesses the device integrated management application operating on the server 201 via the browser 301 of the PC 300. Further, using an additional plugin installation function provided by the device integrated management application, the Manager A sends the installation package of the plugin A to the device integrated management application and instructs installation of the package. It is now assumed that the installation package of the plugin A includes the plugin information illustrated in FIG. 4. The installation instruction includes administrator information of the plugin.

The plugin management table stored in the plugin information holding unit 205 of the device integrated management application is in the state illustrated in FIG. 5.

Figure 22:
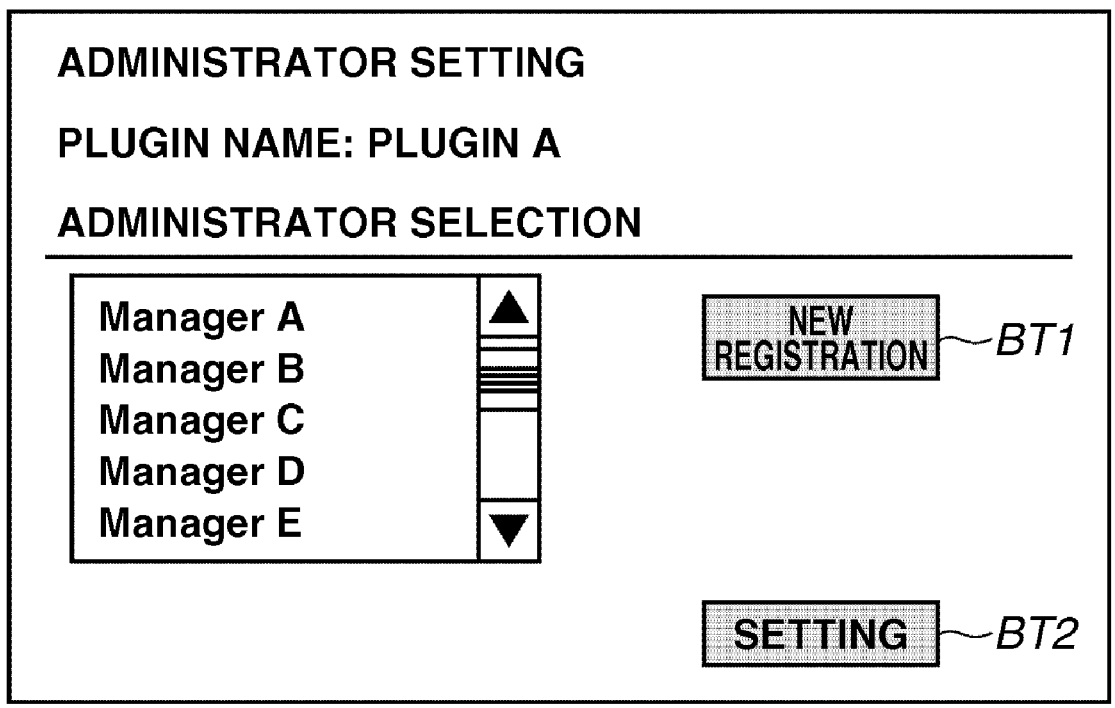
FIG. 22 illustrates an example user interface (UI) provided by the management apparatus according to an exemplary embodiment of the present invention.

FIG. 22 illustrates an example user interface (UI) provided by the management apparatus according to the present exemplary embodiment. An administrator of the plugin A can be set using the UI illustrated in FIG. 22, which is displayed when the plugin is installed.

In FIG. 22, an administrator selection field of the UI displays a list of administrators registered beforehand in the administrator information table (see FIG. 23) stored in the administrator information management unit 208 of the device integrated management application. The administrator, when executing installation, selects an administrator of the plugin A from the administrator selection field. If no administrator is registered in the administrator information table (see FIG. 23), the administrator can newly register an administrator by operating buttons BT1 and BT2.

In the present exemplary embodiment, the Manager A sets his/her own name as an administrator of the plugin A.

In step S700, in response to the administrator setting operation by the Manager A, the device integrated management application registers the Manager A as an administrator of the plugin A. FIG. 24 illustrates example plugin information used by the management apparatus according to an exemplary embodiment of the present invention. In the present exemplary embodiment, the plugin administrator correspondence table indicates the correspondence between each plugin and its plugin administrator.

The plugin administrator correspondence table illustrated in FIG. 24 includes items of (1) plugin ID and (2) administrator ID.

As described above, the method used in the present exemplary embodiment is explicitly setting administrators. However, any administrator who is executing installation of a plugin can be automatically set as a plugin administrator.

A plurality of plugin administrators can be selected simultaneously and can be set individually or as a group of plugin administrators.

Figures 25, 26:
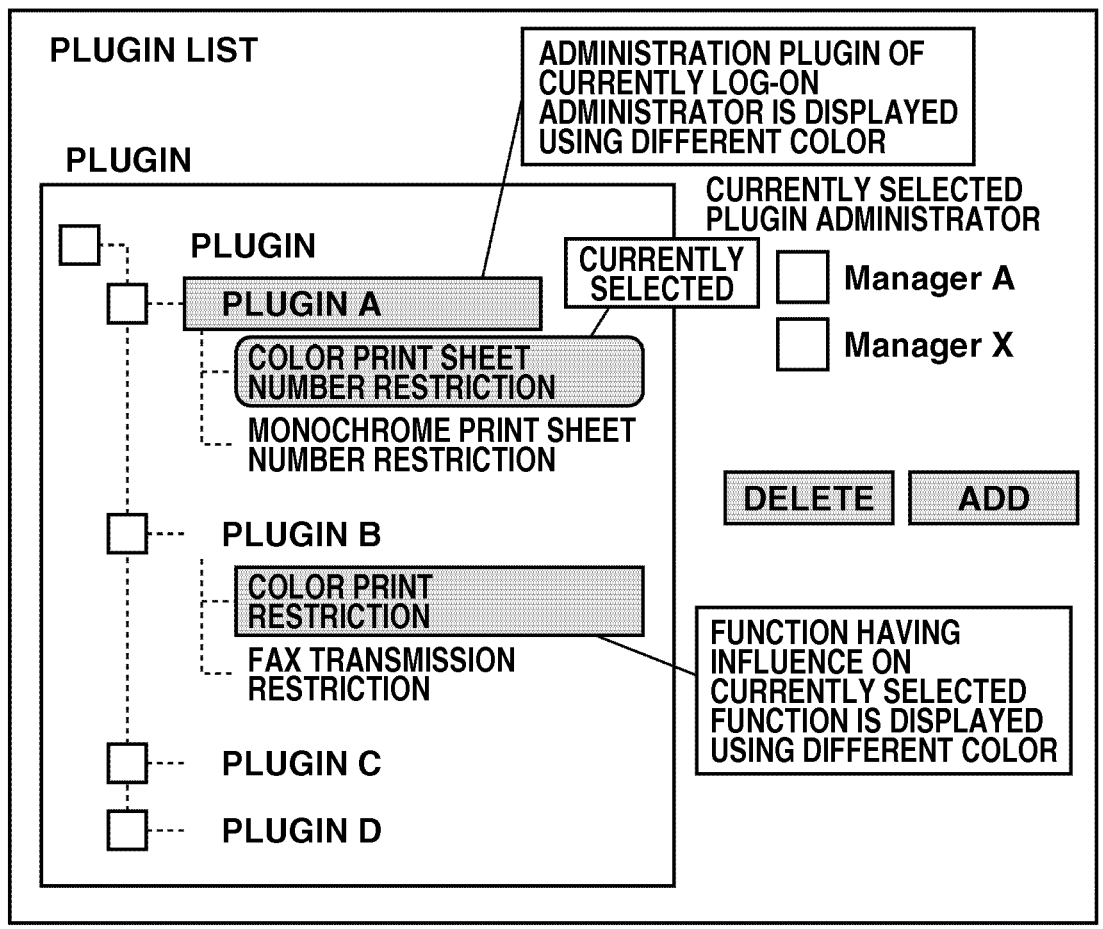
FIG. 25 illustrates an example user interface provided by the management apparatus according to an exemplary embodiment of the present invention.
FIG. 26 illustrates an example notification method management table used by the management apparatus according to an exemplary embodiment of the present invention.

The device integrated management application prepares a UI screen illustrated in FIG. 25, which displays a list of plugins and related administrators, and provides a unit for changing the administrators.

When the plugin management unit 203 of the device integrated management application receives a plugin installation instruction, the plugin management unit 203 sends plugin information to the conflict avoidance processing unit 204. Then, in step S701, the conflict avoidance processing unit 204 arbitrates the device resources. The device resource arbitration method is similar to those described in the first and second exemplary embodiments. In the present exemplary embodiment, the plugin management table does not include any device resource that conflicts with the device resource used by the plugin A, as a result of the arbitration. Therefore, as a determination result in step S702 (in which the influence on the existing plugin is checked), the conflict avoidance processing unit 204 determines that there is not any plugin function currently conflicting. Then, the processing proceeds to step S704 in which the conflict avoidance processing unit 204 updates the plugin management table.

The updated plugin management table is in the state illustrated in FIG. 6. In FIG. 6, the "color printable sheet number setting (i.e., color upper-limit value setting)" function and the "monochrome print sheet setting (i.e., monochrome upper-limit value setting)" function of the plugin A are both effective.

When the device resource conflict arbitration processing is completed, the conflict avoidance processing unit 204 sends the arbitration result to the plugin management unit 203. Then, in step S705, the plugin management unit 203 continues installing the plugin A so that the functions of the plugin A can be used as part of the device integrated management application.

In the present exemplary embodiment, after the plugin A is added to the device integrated management application according to the above-described procedure, the plugin B is installed in the following manner. More specifically, the Manager B instructs, via the browser 303 of the PC 302, the device integrated management application to install the plugin B.

It is now assumed that an installation package of the plugin B includes the plugin information illustrated in FIG. 7. The processing for installing the plugin B is described below with reference to the flowchart illustrated in FIG. 21.

In step S700, the Manager B is set as a plugin administrator. In response to the plugin installation instruction, in step S701, the conflict avoidance processing unit 204 performs device resource arbitration processing.

After the conflict arbitration processing for all functions of the plugin B is completed, the plugin management unit 203 displays the arbitration result on the browser 303 of the PC 302 (installation instruction source). As a result of the arbitration processing, if in step S702 the conflict avoidance processing unit 204 determines that the existing plugin function is ineffective or restricted, the plugin management unit 203 refers to the next table. In the present exemplary embodiment, the table to be referred to includes the administrator information table (see FIG. 23) stored in the administrator information management unit 208, the plugin administrator correspondence table (see FIG. 24), and a notification method management table (see FIG. 26).

FIG. 26 illustrates an example notification method management table stored in the administrator information management unit 208 illustrated in FIG. 20.

The notification method management table illustrated in FIG. 26 can be used to manage the method for notifying the administrator of occurrence of any conflict between plugin functions.

A setting of a notification method can be performed by displaying a user interface illustrated in FIG. 27.

FIG. 27 illustrates an administrator management screen of the device integrated management application provided by the management apparatus according to the present exemplary embodiment.

As illustrated in FIG. 27, when an administrator is newly registered or edited, if there is any other plugin influencing the plugin managed by the administrator, an appropriate notification unit can be selected from a plurality of options, such as "E-mail", "UI display", and "Not notify", which are prepared beforehand.

For example, if the option "UI display" is selected, an example user interface illustrated in FIG. 28 can be displayed on a top page when the corresponding administrator logs in the device integrated management application.

In the above-described exemplary embodiment, the notification method is set for each administrator. However, the notification method can be set for each plugin or each plugin function.

Referring back to the flowchart illustrated in FIG. 21, if in step S702 the conflict avoidance processing unit 204 determines that there is any influence on the existing plugin, then in step S703, the plugin management 203 refers to the information of each table and sends a notification to the administrator of the existing plugin to be influenced according to a predetermined method. Next, in step S704, the conflict arbitration unit 206 updates the plugin management table based on the arbitration result. The updating method is similar to that described in the first or second exemplary embodiment.

Then, in step S705, the plugin management unit 203 continues installing the plugin B so that the functions of the plugin B can be used as part of the device integrated management application. Then, the plugin management unit 203 terminates the processing of this routine.

According to the above-described method, the processing for disabling or restricting the plugin function is automatically performed and the result is notified to the plugin administrator who is influenced by the disabling or restricting processing. Alternatively, the processing for disabling or restricting the plugin function can be performed only when it is approved by other plugin administrators. In this case, the plugin management unit 203 performs the notification of step S703 to obtain an administrator's approval for the processing "disabling or restricting the plugin function."

In the present exemplary embodiment, the "color print restricting" function of the plugin B and the "color printing sheet number restricting" (i.e., "color upper-limit value setting") function of the plugin A use the same device resource "number of remaining color printable sheets."

When the "color print restricting" function of the plugin B has a priority higher than that of the "color printing sheet number restricting" (i.e., "color upper-limit value setting") function of the plugin A, the plugin management unit 203 obtains an approval by the administrator of the plugin A. If the function is "exclusive", the plugin management unit 203 obtains an approval for disabling the "color printing sheet number restricting" (i.e., "color upper-limit value setting") function of the plugin A. If the function is "shared", the plugin management unit 203 obtains an approval for adding a restrictive condition that the setting value of the "color printing sheet number restricting" (i.e., "color upper-limit value setting") function of the plugin A is subordinate to the setting value of the "color print restricting" function of the plugin B.

When the conflict arbitration unit 206 updates the plugin management table in step S704, information indicating that the "color print restricting" function of the plugin B is in an approval waiting state is added to the table. In the case, the plugin management table holds both before-change setting and after-change setting as illustrated in FIG. 29.

In step S705, the plugin management unit 203 continues installing the plugin B so that the functions of the plugin B can be used as part of the device integrated management application. In this case, the approval waiting function cannot be used unless an approval is obtained.

Next, an example unit for approval of the setting change by the administrator of the plugin to be influenced is described.

Figure 30:
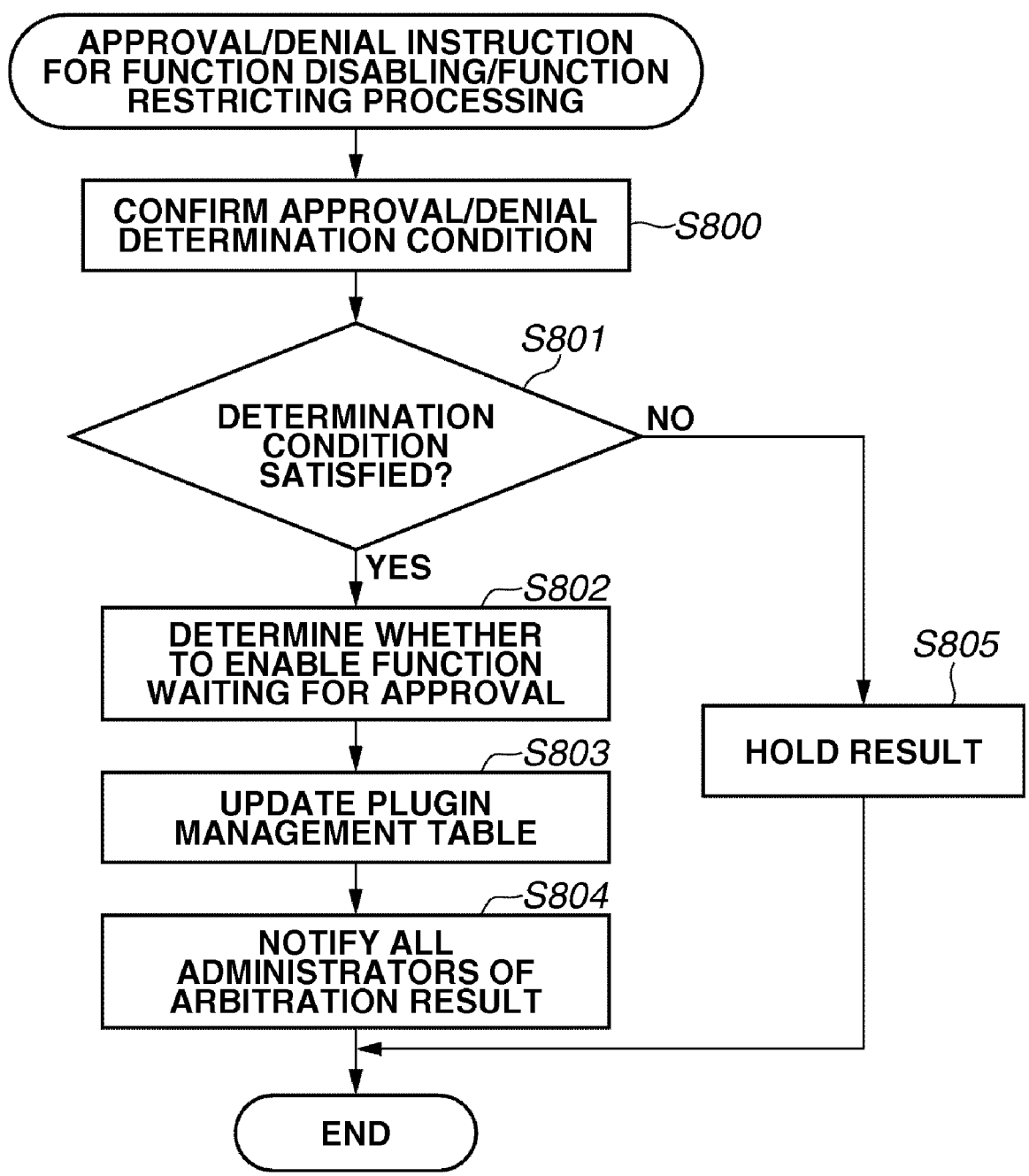
FIG. 30 is a flowchart illustrating an example procedure of data processing performed by the management apparatus according to an exemplary embodiment of the present invention.

FIG. 30 is a flowchart illustrating an example procedure of data processing performed by the management apparatus according to the present exemplary embodiment. The data processing illustrated in FIG. 30 is example processing performed when the administrator of the plugin to be influenced approves the setting change. To realize each step of the flowchart illustrated in FIG. 30, the CPU 101 of the server 201 executes the device integrated management application loaded to the RAM 103.

When the administrator of the plugin to be influenced logs in the device integrated management application, a plugin setting change approval screen illustrated in FIG. 31 is displayed via a link of the top page illustrated in FIG. 28.

In this case, the administrator confirms the presence of any other plugin that influences the plugin that the administrator currently manages and then select "approval" or "denial."

In response to the administrator's "approval"/"denial" notification, in step S800, the conflict arbitration unit 206 of the device integrated management application confirms a determination condition to approve or deny the usage of the approval waiting function.

The determination condition is, for example, "approval by all administrators of the plugins to be influenced is required" or "updating is executed only when the approval exceeds a predetermined threshold", which can be set beforehand in the device integrated management application. The threshold can be a weighted value calculated based on the priority. For example, there are five plugins to be influenced, which are allocated 100, 200, 300, 400, and 500 in priority. In this case, a larger value indicates a higher priority.

The condition defined in this case is "updating is executed if the approval obtained exceeds 50%." As the total value is 1500 (=100+200+300+400+50), the updating is executed when the approval exceeds 750 (corresponding to 50%). In this case, the updating can be executed if the "approval" by three plugin administrators having priorities of 500, 200, and 100 is obtained (even when the approval by the plugin administrators having priorities of 400 and 300 is not obtained).

It is desired that the above-described condition is set according to an actual operating situation of the device integrated management application.

For example, when an administrator of one plugin is absent for a long time, it is desired to set a condition "provide a threshold" so that an important plugin function can be surely installed.

If in step S801 the conflict arbitration unit 206 determines that the condition is not satisfied, the processing proceeds to step S805, in which the conflict arbitration unit 206 holds the received "approval"/"denial" result. The approval waiting function is continuously kept in an approval waiting state.

If in step S801 the conflict arbitration unit 206 determines that the condition is satisfied, then in step S802, the conflict arbitration unit 206 determines whether to enable the approval waiting function. Then, in step S803, the conflict arbitration unit 206 updates the plugin management table for the approval waiting function and for the plugin function to be influenced by the approval waiting function.

In this case, the "approval waiting" information added to the plugin management table in step S704 illustrated in FIG. 21 is deleted. When it is determined that enabling the approval waiting function is denied, the approval waiting function is continuously kept in an ineffective state and the plugin function to be influenced is continuously kept in an effective state.

If it is determined that enabling the approval waiting function is approved, the approval waiting function is enabled.

The plugin function to be influenced is disabled if each plugin function corresponding to the same device resource is exclusive.

In case of a shared function, the plugin function to be influenced is kept in an effective state, although the function setting is subordinate to the content set by the existing plugin.

In step S804, the plugin management unit 203 notifies all administrators whose approval was requested in step S703 of FIG. 21 of the arbitration result according to a predetermined method, and terminates the processing of this routine.

In the above-described exemplary embodiment, setting of administrators is performed for each plugin. However, the setting of administrators can be performed for each plugin function or for any other arbitrary unit. As a function assisting an operation of the plugin administrator, the device integrated management application provides the plugin list display screen (see FIG. 25). The plugin list display screen displays a list of installed plugins and plugin functions.

The plugin managed by the log-on administrator and other plugin functions influencing the managed plugin can be differently displayed using different colors and can be used as reference information when the administrator updates the plugin functions. The plugin list display screen can be created based on the plugin management table, the administrator information table, and the plugin administrator correspondence table.

A fourth exemplary embodiment of the present invention is described below. Constituent elements similar to those described in the above-described first, second, and third exemplary embodiments are denoted by the same reference numerals.

A method for avoiding any conflict among plugin functions according to the fourth exemplary embodiment is performed when two or more system administrators are present for each plugin.

Figure 32:
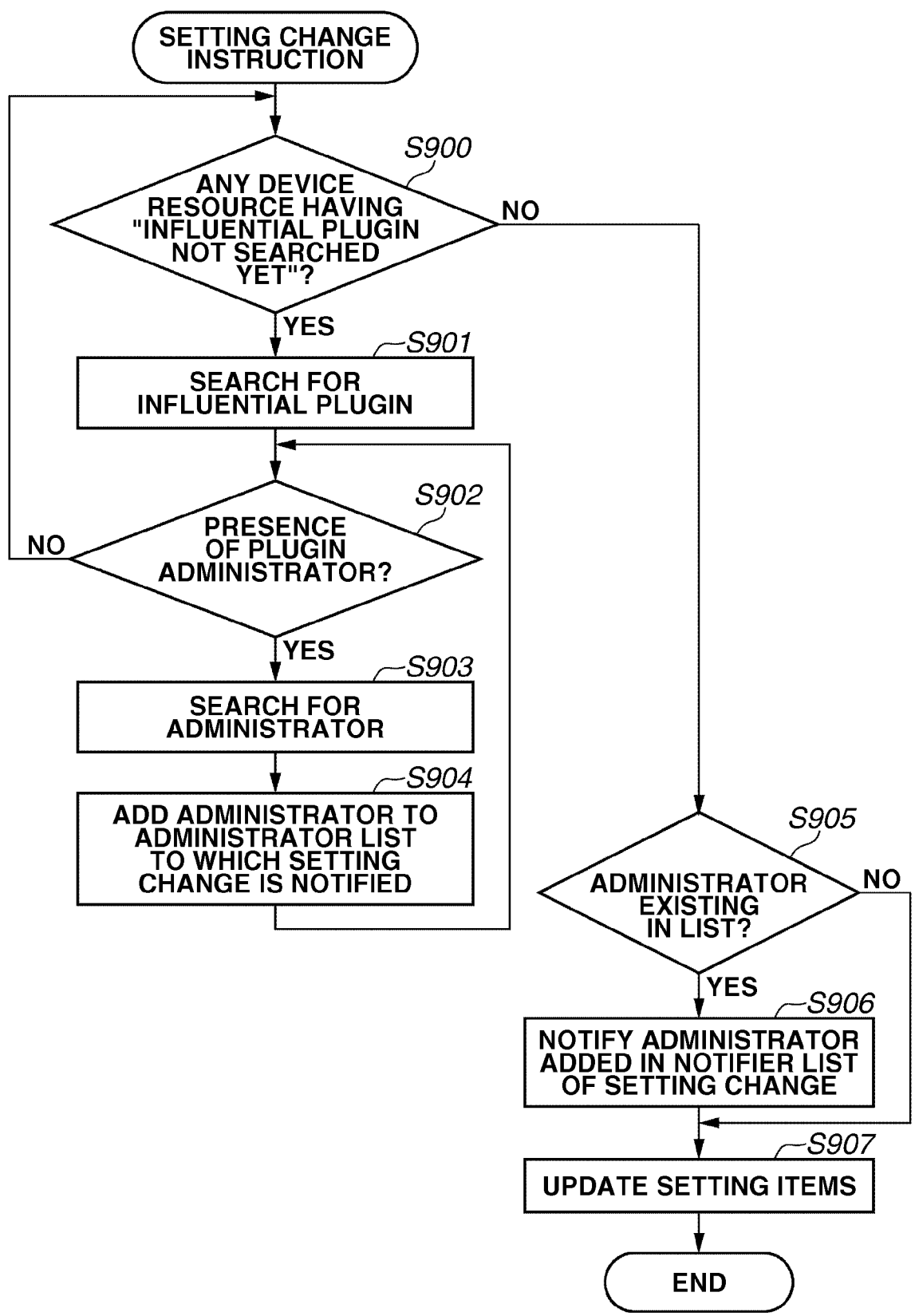
FIG. 32 is a flowchart illustrating an example procedure of data processing performed by the management apparatus according to an exemplary embodiment of the present invention.

FIG. 32 is a flowchart illustrating an example procedure of data processing performed by the management apparatus according to the fourth exemplary embodiment. The data processing illustrated in FIG. 32 is example processing for setting each plugin function in the device integrated management application. To realize each step of the flowchart illustrated in FIG. 32, the CPU 101 of the server 201 executes the device integrated management application loaded to the RAM 103. Plugin functions and plugin administrators subjected to the conflict arbitration processing are similar to those described in the third exemplary embodiment.

FIG. 33 illustrates an example user interface provided by the management apparatus according to the present exemplary embodiment. The example UI illustrated in FIG. 33 includes setting items for the "color upper-limit value setting" function of the plugin A and the "color print restricting" function of the plugin B.

The setting screen illustrated in FIG. 33 can be used to display plugin functions managed by the log-on administrator. A gray-out display can be used to indicate the management plugin function of other administrator.

In the exemplary embodiment, the "color upper-limit value setting" function of the plugin A and the "color print restricting" function of the plugin B are "shared." The "color print restricting" function of the plugin B has a higher priority compared to that of the "color upper-limit value setting" function of the plugin A.

The Manager B accesses the device integrated management application operating on the server 201 via the browser 303 of the PC 302, and requests the device integrated management application to display the setting screen.

When the device integrated management application receives the request from the Manager B, the device integrated management application displays the setting screen on the browser 303 of the PC 302 (see FIG. 33).

The Manager B changes a setting value of the "color print restricting" function on the displayed screen. In this case, the Manager B sets "color print inhibited" for the User A and presses a "setting" button BT11.

In response to the "setting" button BT11 pressing event, the device integrated management application searches the plugin management table for a device resource to which a setting value of the setting updating function is set. Then, in step S900, the device integrated management application determines whether there is any device resource having an influential plugin not searched yet. If in step S900 the device integrated management application determines that the device resource having the influential plugin not searched yet is not present, the processing proceeds to step S905.

If in step S900 the device integrated management application determines that the device resource having the influential plugin not searched yet is present, the processing proceeds to step S901. Then, in step S901, the device integrated management application searches the plugin management table for other plugin function that uses the device resource searched in step S900. Then, in step S902, the device integrated management application determines whether the plugin administrator is present for each plugin function searched in step S901. If it is determined that the plugin administrator is not present, the processing returns to step S900.

If in step S902 the device integrated management application determines that the plugin administrator is present, then in step S903, the device integrated management application searches for the administrator referring to the administrator information table stored in the administrator information management unit 208. Next, in step S904, the device integrated management application adds the identified administrator to an administrator list to which the setting change is notified. Then, the processing returns to step S902.

If in step S900 the device integrated management application determines that the device resource is not present, the processing proceeds to step S905. Then, in step S905, the device integrated management application determines whether the administrator is present in the list. If the device integrated management application determines that no administrator is present, the processing proceeds to step S907.

If in step S905 the device integrated management application determines that the administrator is present in the list, the processing proceeds to step S906. Then, in step S906, the device integrated management application determines contents to be notified to respective searched administrators based on the plugin administrator correspondence table and adds the determined contents to a notifier list.

In the exemplary embodiment, the setting change of the "color print restricting" function of the plugin B influences the setting value for the "color upper-limit value setting" function of the plugin A.

Notifying the Manager A of the content that the "color upper-limit value setting" function of the plugin A is set to 0 is added to the notifier list.

In step S906, the device integrated management application notifies the administrator added in the notifier list of the setting change. Next, in step S907, the device integrated management application updates the setting items of each plugin and then terminates the processing of this routine.

According to the above-described method, the device integrated management application automatically updates the setting items of respective plugins and notifies the updated result to the administrators of other plugins. Alternatively, the setting items of respective plugins can be updated only when it is approved by other plugin administrators. In this case, the device integrated management application performs the notification of step S906 to obtain an administrator's approval for the processing "changing the setting values of plugin functions."

In the present exemplary embodiment, the device integrated management application requests the Manager A (the administrator of the plugin A) to approve the change of the "color upper-limit value setting" function of the plugin A to "0".

In step S907, when the conflict arbitration unit 206 updates the plugin management table, information including the setting change of the "color print restricting" function of the plugin B in an approval waiting state is added to the plugin management table. In this case, the setting change of the plugin B is not executed unless it is approved by the administrator of other plugin who stores both the before-change setting and the after-change setting in the plugin management table.

FIG. 34 is a flowchart illustrating an example procedure of data processing performed by the management apparatus according to the present exemplary embodiment. The data processing illustrated in FIG. 34 is example processing performed when the administrator of the plugin to be influenced approves the setting change. To realize each step of the flowchart illustrated in FIG. 34, the CPU 101 of the server 201 executes the device integrated management application loaded to the RAM 103.

In the present processing, when the administrator of the plugin to be influenced logs in the device integrated management application, a link to the plugin setting change approval screen (see FIG. 31) is displayed on the top page (see FIG. 28) or on the setting screen (see FIG. 33). When the setting change approval screen (see FIG. 31) is displayed, the administrator confirms that other plugin influences the plugin managed by the administrator and selects "approval" or "denial" about the setting change.

In step S1000, the conflict arbitration unit 206 of the device integrated management application confirms a determination condition. The method for confirming the determination condition is similar to that described in third exemplary embodiment.

In step S1001, the conflict arbitration unit 206 determines whether the condition for executing the determination is satisfied. If the conflict arbitration unit 206 determines that the condition for executing the determination is not satisfied, the processing proceeds to step S1005. Then, in step S1005, the conflict arbitration unit 206 holds the received "approval"/"denial" result. The approval waiting setting change is continuously kept in an approval waiting state.

If in step S1001 the conflict arbitration unit 206 determines that the condition for executing the determination is satisfied, then in step S1002, the conflict arbitration unit 206 determines whether to approve the approval waiting setting change. In this case, the conflict arbitration unit 206 deletes the "approval waiting" information added to the plugin management table in step S907 illustrated in FIG. 32.

If the conflict arbitration unit 206 determines that the setting change is approved, then in step S1003, the conflict arbitration unit 206 updates settings of the approval waiting plugin function. In addition, the conflict arbitration unit 206 updates the setting of the plugin to be influenced.

If in step S1002 the conflict arbitration unit 206 determines that the setting change is not approved, the conflict arbitration unit 206 leaves the setting values unchanged. The processing proceeds to step S1004.

Then, in step S1004, the plugin management unit 203 notifies the arbitration result to the administrator who instructed the setting change and all administrators who requested the approval in step S906 (see FIG. 32) according to a predetermined method, and terminates the processing of this routine.

An example configuration of data processing programs readable by the management apparatus according to an exemplary embodiment of the present invention is described below with reference to a memory map illustrated in FIG. 35.

FIG. 35 illustrates an example memory map of a storage medium storing various data processing programs readable by the management apparatus according to an exemplary embodiment of the present invention.

Although not illustrated in the drawing, the storage medium can store management information for the programs stored in the storage medium, such as version information, creator name, and information relevant to the OS that reads the programs, e.g., icons discriminately displaying the programs.

Further, a directory of the above-described storage medium can manage data belonging to various programs. Moreover, the storage medium can store a program to be used to install various programs on a computer and a decompression program if the installed program is compressed.

A host computer can execute a program installed from the outside to realize the functions indicated in FIGS. 3, 10, 14, 17, 19, 21, 30, 32, and 34 according to the present exemplary embodiment. In this case, the present invention can be applied in a case where an information group including the program is supplied from an external storage medium to an output apparatus using an appropriate storage medium (e.g., CD-ROM, flash memory, and FD) or via a network.

A computer-readable storage medium storing a software program code for realizing the functions of the above-described exemplary embodiments can be supplied to a system or an apparatus. A computer (or CPU or micro-processing unit (MPU)) in the system or the apparatus can execute the program code to realize the functions of the above-described exemplary embodiments.

In this case, the program code itself read out of the storage medium can realize novel functions of the present invention. The storage medium storing the program code constitutes the present invention.

Accordingly, equivalents of programs (e.g., object code, interpreter program, and OS script data) are usable if they possess comparable functions.

A computer-readable storage medium supplying the program can be selected from any one of a floppy disk, a hard disk, an optical disk, a magneto-optical (MO) disk, a compact disc—ROM (CD-ROM), a CD-recordable (CD-R), a CD-rewritable (CD-RW), a magnetic tape, a nonvolatile memory card, a ROM, and a digital versatile disc (DVD (DVD-ROM, DVD-R)).

In this case, the program code itself read out of the storage medium realizes the above-described exemplary embodiments. The storage medium storing the program code constitutes the present invention.

The method for supplying the program includes accessing a website on the Internet using the browsing function of a client computer, when the website allows each user to download the computer program of a storage medium according to the present invention, or compressed files of the programs having automatic installing functions, to a hard disk or other recording medium of the user. Furthermore, the program code of the storage medium constituting the program of the present invention is dividable into a plurality of files so that respective files are downloadable from different websites. Namely, the present invention encompasses World Wide Web (WWW) servers and File Transfer Protocol (FTP) server that allow numerous users to download the program files so that their computers can realize the functions or processes of the storage medium according to the present invention.

Moreover, enciphering the program of the storage medium according to the present invention and storing the enciphered program on a CD-ROM or comparable storage medium is an exemplary method when the program of the present invention is distributable to the users. The authorized users (i.e., users satisfying predetermined conditions) are allowed to download key information from a website on the Internet. The users can decipher the program with the obtained key information and can install the program on their computers. When the computer reads and executes the installed program, the computer can realize the functions of the above-described exemplary embodiments.

Moreover, an operating system (OS) or other application software running on a computer can execute part or all of actual processing based on instructions of the programs to realize the functions of the above-described exemplary embodiments.

Additionally, the program code read out of a storage medium can be written into a memory of a function expansion board inserted in a computer or into a memory of a function expansion unit connected to the computer. In this case, based on instructions of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-096021 filed Apr. 2, 2008, which is hereby incorporated by reference herein in its entirety.

What is claimed is:

1. A management apparatus configured to control usage of functions provided by an image forming apparatus, comprising:
- a storage unit configured to store values usable for resources to be used for the functions provided by the image forming apparatus for each user;
- a first setting unit configured to perform a first setting for the user to control the usage of the functions provided by the image forming apparatus;
- a second setting unit configured to perform a second setting for the user, which is different from the first setting, to control the usage of the functions provided by the image forming apparatus; and
- a detection unit configured to detect whether a resource relating to the first setting accords with a resource relating to the second setting to confirm any conflict between the first setting and the second setting,
- wherein if the detection unit detects that the resource relating to the first setting disaccords with the resource relating to the second setting, the storage unit stores the value usable for the resource relating to the first setting based on the first setting and stores the value usable for the resource relating to the second setting based on the second setting,
- wherein if the detection unit detects that the resource relating to the first setting accords with the resource relating to the second setting, the storage unit stores the value usable for the relevant resource based on the first setting or the second setting, and
- wherein if the detection unit detects that the resource relating to the first setting accords with the resource relating to the second setting, the storage unit stores the value usable for the relevant resource based on the setting having a higher priority between the first setting and the second setting.

2. The management apparatus according to claim 1, wherein the first setting unit and the second setting unit perform a setting based on a user instruction, wherein the management apparatus further comprises a notification unit configured to notify the user who has entered the instruction, that the storage unit stored the value usable for the relevant resource based on the first setting or the second setting, if the detection unit detects that the resource relating to the first setting accords with the resource relating to the second setting.

3. The management apparatus according to claim 1, wherein if the detection unit detects that the resource relating to the first setting accords with the resource relating to the second setting, setting by the first setting unit or the second setting unit is restricted.

4. The management apparatus according to claim 1, wherein the resource is the number of printing sheets.

5. The management apparatus according to claim 4, wherein the first setting and the second setting are two different settings selected from a setting for determining whether to approve the usage of a print function of the image forming apparatus, a setting for limiting the number of printing sheets usable for the print function of the image forming apparatus, and a setting for limiting the amount of money to be charged based on the usage of the print function of the image forming apparatus.

6. A management apparatus configured to control usage of functions provided by an image forming apparatus, comprising:
- a storage unit configured to store values usable for resources to be used for the functions provided by the image forming apparatus for each user;
- a first setting unit configured to perform a first setting for the user to control the usage of the functions provided by the image forming apparatus;
- a second setting unit configured to perform a second setting for the user, which is different from the first setting, to control the usage of the functions provided by the image forming apparatus; and
- a detection unit configured to detect whether a resource relating to the first setting accords with a resource relating to the second setting to confirm any conflict between the first setting and the second setting,
- wherein if the detection unit detects that the resource relating to the first setting disaccords with the resource relating to the second setting, the storage unit stores the value usable for the resource relating to the first setting based on the first setting and stores the value usable for the resource relating to the second setting based on the second setting, and
- wherein an application capable of controlling the functions provided by the image forming apparatus operates on the management apparatus, and one of or both of the first setting unit and the second setting unit is provided as a function based on an additional plugin to be incorporated to the application.

7. A method for a management apparatus including at least one processor communicatively-coupled to a memory via a bus, configured to control usage of functions provided by an image forming apparatus, comprising:
- storing values usable for resources to be used for the functions provided by the image forming apparatus in a storage unit for each user;
- performing a first setting for the user to control the usage of the functions provided by the image forming apparatus;
- performing a second setting for the user, which is different from the first setting, to control the usage of the functions provided by the image forming apparatus;
- detecting whether a resource relating to the first setting accords with a resource relating to the second setting to confirm any conflict between the first setting and the second setting,
- if it is detected that the resource relating to the first setting disaccords with the resource relating to the second setting, storing the value usable for the resource relating to the first setting in the storage unit based on the first setting and storing the value usable for the resource relating to the second setting in the storage unit based on the second setting,
- if it is detected that the resource relating to the first setting accords with the resource relating to the second setting, storing the value usable for the relevant resource based on the first setting or the second setting, and
- if it is detected that the resource relating to the first setting accords with the resource relating to the second setting, storing the value usable for the relevant resource based on the setting having a higher priority between the first setting and the second setting.

8. The method according to claim 7, wherein the first setting and the second setting are performed based on a user's instruction, wherein the method further comprises notifying the user who has entered the instruction, that the value usable for the relevant resource is stored in the storage unit based on the first setting or the second setting, if it is detected that the resource relating to the first setting accords with the resource relating to the second setting.

9. The method according to claim 7, further comprising, if it is detected that the resource relating to the first setting accords with the resource relating to the second setting, restricting the setting by the first setting or the second setting.

10. The method according to claim 7, wherein the resource is the number of printing sheets.

11. The method according to claim 10, wherein the first setting and the second setting are two different settings selected from a setting for determining whether to approve the usage of a print function of the image forming apparatus, a setting for limiting the number of printing sheets usable for the print function of the image forming apparatus, and a setting for limiting the amount of money to be charged based on the usage of the print function of the image forming apparatus.

12. A method for a management apparatus including at least one processor communicatively-coupled to a memory via a bus, configured to control usage of functions provided by an image forming apparatus, comprising:
    storing values usable for resources to be used for the functions provided by the image forming apparatus in a storage unit for each user;
    performing a first setting for the user to control the usage of the functions provided by the image forming apparatus;
    performing a second setting for the user, which is different from the first setting, to control the usage of the functions provided by the image forming apparatus;
    detecting whether a resource relating to the first setting accords with a resource relating to the second setting to confirm any conflict between the first setting and the second setting,
    if it is detected that the resource relating to the first setting disaccords with the resource relating to the second setting, storing the value usable for the resource relating to the first setting in the storage unit based on the first setting and storing the value usable for the resource relating to the second setting in the storage unit based on the second setting,
    wherein an application capable of controlling the functions provided by the image forming apparatus operates on the management apparatus, and one of or both of performing the first setting and performing the second setting is provided as a function based on an additional plugin to be incorporated to the application.

13. A computer readable storage medium storing a computer-executable process, the computer-executable process causing a computer to implement a method comprising:
    storing values usable for resources to be used for functions provided by an image forming apparatus in a storage unit for each user;
    performing a first setting for the user to control the usage of the functions provided by the image forming apparatus;
    performing a second setting for the user, which is different from the first setting, to control the usage of the functions provided by the image forming apparatus;
    detecting whether a resource relating to the first setting accords with a resource relating to the second setting to confirm any conflict between the first setting and the second setting,
    if it is detected that the resource relating to the first setting disaccords with the resource relating to the second setting, storing the value usable for the resource relating to the first setting in the storage unit based on the first setting and storing the value usable for the resource relating to the second setting in the storage unit based on the second setting,
    if it is detected that the resource relating to the first setting accords with the resource relating to the second setting, storing the value usable for the relevant resource based on the first setting or the second setting, and
    if it is detected that the resource relating to the first setting accords with the resource relating to the second setting, storing the value usable for the relevant resource based on the setting having a higher priority between the first setting and the second setting.

* * * * *